US007345668B2

(12) United States Patent
Iijima

(10) Patent No.: US 7,345,668 B2
(45) Date of Patent: Mar. 18, 2008

(54) METHOD OF DRIVING LIQUID CRYSTAL PANEL, LIQUID CRYSTAL DEVICE, AND ELECTRONIC APPARATUS

(75) Inventor: Chiyoaki Iijima, Ina (JP)

(73) Assignee: Seiko Epson Corporation (JP)

( * ) Notice: Subject to any disclaimer, the term of this patent is extended or adjusted under 35 U.S.C. 154(b) by 677 days.

(21) Appl. No.: 10/902,703

(22) Filed: Jul. 29, 2004

(65) Prior Publication Data

US 2005/0041007 A1 Feb. 24, 2005

(30) Foreign Application Priority Data

Jul. 31, 2003 (JP) ............................ 2003-284151
Jun. 8, 2004 (JP) ............................ 2004-170100

(51) Int. Cl.
*G09G 3/36* (2006.01)
*G02F 1/133* (2006.01)

(52) U.S. Cl. .......................... 345/101; 345/87; 345/89; 345/90; 345/101; 349/56; 349/72

(58) Field of Classification Search .................. 345/55, 345/84, 87, 89, 90, 101, 204, 690; 349/56, 349/72
See application file for complete search history.

(56) References Cited

U.S. PATENT DOCUMENTS 5,717,421 A * 2/1998 Katakura et al. ........... 345/101
5,754,154 A * 5/1998 Katakura et al. ........... 345/101
5,903,251 A * 5/1999 Mori et al. ................. 345/101
6,037,920 A * 3/2000 Mizutome et al. .......... 345/101
6,930,667 B1 * 8/2005 Iijima et al. ................ 345/101
2004/0201564 A1 10/2004 Sugino

FOREIGN PATENT DOCUMENTS

JP 63-249825 10/1988

(Continued)

OTHER PUBLICATIONS

Communication from Korean Patent Office regarding related application, No Translation.

(Continued)

*Primary Examiner*—My-Chau T. Tran
(74) *Attorney, Agent, or Firm*—Harness, Dickey & Pierce, P.L.C.

(57) ABSTRACT

A liquid crystal device is provided comprising: a liquid crystal panel displaying grayscale levels by applying a driving signal to a pair of electrodes having liquid crystal interposed therebetween and displaying white when voltage is applied, the driving signal having a pulse width that is modulated according to the grayscale level; a temperature detecting unit detecting a temperature of the liquid crystal panel; a discrimination unit discriminating whether the temperature detected by the temperature detecting unit is a predetermined threshold value or more; and a pulse width defining unit that defines the pulse width according to the grayscale level such that the pulse width of the driving signal is gradually increased as the grayscale level becomes bright when the temperature is the threshold value or more; and changes the pulse width such that the pulse width corresponding to the darkest grayscale level is larger than the pulse width corresponding to that at which the temperature is the threshold value or more when the temperature is less than the threshold value.

21 Claims, 18 Drawing Sheets

FOREIGN PATENT DOCUMENTS

| | | |
|---|---|---|
| JP | 02-002823 | 1/1990 |
| JP | 03-010217 | 1/1991 |
| JP | 03-031817 | 2/1991 |
| JP | 05-297350 | 11/1993 |
| JP | 08-248395 | 9/1996 |
| JP | 09-274469 | 10/1997 |
| JP | 10-253944 | 9/1998 |
| JP | 10-260390 | 9/1998 |
| JP | 2000-194325 | 7/2000 |
| JP | 2001-159753 | 6/2001 |
| JP | 2003-207761 | 7/2003 |
| JP | 2003-255304 | 9/2003 |

OTHER PUBLICATIONS

Communication from Japanese Patent Office re: related application, No Translation.

Communication from Chinese Patent Office regarding counterpart application, No Translation.

* cited by examiner

FIG. 7A

72

| GRAYSCALE LEVEL | PULSE WIDTH |
|---|---|
| 1 | W1 |
| 2 | W2 |
| 3 | W3 |
| 4 | W4 |
| 5 | W5 |
| 6 | W6 |
| 7 | W7 |
| 8 | W8 |
| 9 | W9 |
| 10 | W10 |
| 11 | W11 |
| 12 | W12 |
| 13 | W13 |
| 14 | W14 |
| 15 | W15 |
| 16 | W16 (=0) |

FIG. 7B

70

| GRAYSCALE LEVEL | PULSE WIDTH | |
|---|---|---|
| | TD = L | TD = H |
| 1 | W1 | ← |
| 2 | W2 | ← |
| 3 | W3 | ← |
| 4 | W4 | ← |
| 5 | W5 | ← |
| 6 | W6 | ← |
| 7 | W7 | ← |
| 8 | W8 | ← |
| 9 | W9 | ← |
| 10 | W10 | ← |
| 11 | W11 | ← |
| 12 | W12 | ← |
| 13 | W13 | ← |
| 14 | W14 | ← |
| 15 | W15 | ← |
| 16 | W16 (=0) | W15 |

F I G. 1 0

70

| GRAYSCALE LEVEL | PULSE WIDTH | |
|---|---|---|
| | TD = L | TD = H |
| 1 | W1 | ← |
| 2 | W2 | ← |
| 3 | W3 | ← |
| 4 | W4 | ← |
| 5 | W5 | ← |
| 6 | W6 | ← |
| 7 | W7 | ← |
| 8 | W8 | ← |
| 9 | W9 | ← |
| 10 | W10 | ← |
| 11 | W11 | ← |
| 12 | W12 | ← |
| 13 | W13 | ← |
| 14 | W14 | ← |
| 15 | W15 | ← |
| 16 | W16 (=0) | W16b |

METHOD OF DRIVING LIQUID CRYSTAL PANEL, LIQUID CRYSTAL DEVICE, AND ELECTRONIC APPARATUS

RELATED APPLICATIONS

This application claims priority to Japanese Patent Application Nos. 2003-284151 filed Jul. 31, 2003 and 2004-170100 filed Jun. 8, 2004, which are hereby expressly incorporated by reference herein in their entirety.

BACKGROUND

1. Technical Field

The present invention relates to a method of driving a liquid crystal panel, a liquid crystal device and an electronic apparatus to prevent malfunctions caused by the disorder of a display grayscale level in a low temperature region.

2. Background Art

In general, a passive matrix liquid crystal panel has the following construction. That is, a passive matrix liquid crystal panel interposes a liquid crystal layer between a pair of substrates having a constant gap, and a plurality of signal electrodes (segment electrodes) are formed in the shape of stripes on the side of one of the substrates facing the other substrate, and a plurality of scanning electrodes (common electrodes) are formed in the shape of stripes on the side of the other substrate facing the first substrate and are perpendicular to the signal electrodes. An optical characteristic of a liquid crystal layer interposed between both electrodes varies corresponding to the voltage difference applied to the electrodes. By this construction, an intersection of a signal electrode and a scanning electrode functions as a pixel.

While one scanning electrode is chosen, and a selected voltage is applied to the chosen scanning electrode, it is possible to control a voltage effective value applied to a liquid crystal layer of each pixel by means of applying the pulse width modulated signal to a signal electrode to distribute the off-state voltage of the same polarity as a selected voltage and the on-state voltage of opposite polarity at the corresponding ratio to display the contents of a pixel located at an intersection of a selected scanning electrode and the signal electrode. As a result, it is possible to display an objective picture with the grayscale level. In addition, because a voltage applied to a liquid crystal layer is a voltage difference of a signal applied to a signal and a scanning electrode, the voltage difference is the substantial driving signal.

However, to make the driving signal be pulse width modulated corresponding to the grayscale level in a low temperature region, a phenomenon occurs in that the predetermined order of the grayscale level is not maintained (grayscale level turning over), and hence, this causes decreased display integrity, which is considered as a weak point.

As an exemplary technology to prevent grayscale level turning over in such a low temperature region, it has been known that the relationship between the pulse width of the driving signal to be applied to a liquid crystal and the temperature of a liquid crystal panel are given as shown in FIG. 19 (for example, refer to Japanese Unexamined Patent Application Publication No. 2001-159753 (refer to FIGS. 1 and 9, and 0032 paragraph)). As a result, according to this technology, a pulse width opposed to each grayscale level is respectively changed depending on the temperature in a low temperature region. Because frequency components of driving signals applied to a liquid crystal layer at the time of the brightest grayscale level (white) and the darkest grayscale level (black) are raised (described below in detail), and grayscale level turning over in a low temperature region is prevented. When a pulse width corresponding to a grayscale level is required, a table created in advance that has stored the relationship of both is used.

However, in using the above technology, it is necessary not only to prepare at least two patterns as a table for the use of normal temperature and low temperature, but also to compensate by gradually changing a pulse width corresponding to each grayscale level from the maximum value to the minimum value in a low temperature region. Because of this, the technology causes a problem in that a construction to prevent grayscale level turning over becomes complicated. Further, a complexity of the construction directly increases power consumption, which conflicts with the trend of low power consumption required in the field where a liquid crystal panel is used.

The present invention is designed considering the above circumstances, and a purpose is to provide a method of driving a liquid crystal panel, a liquid crystal device and an electronic apparatus that can prevent the disorder of the grayscale level in a low temperature region by means of a simple construction.

SUMMARY

In order to achieve the above objects, there is provided a method of driving a liquid crystal panel which displays grayscale levels by applying a driving signal, whose pulse width is modulated according to the grayscale level, to a pair of electrodes having liquid crystal interposed therebetween and displays white when no voltage is applied, the method comprising the steps of: detecting the temperature of the liquid crystal panel or the temperature of the surrounding environment in which the liquid crystal panel is disposed; discriminating whether or not the detected temperature is a predetermined threshold value or more; and when the detected temperature is discriminated to be the threshold value or more, defining the pulse width according to the grayscale level such that the pulse width of the driving signal is gradually decreased as the grayscale level becomes bright, and when the detected temperature is discriminated to be less than the threshold value, changing the pulse width such that the pulse width corresponding to the brightest grayscale level is larger than the pulse width corresponding to that at which the temperature is the threshold value or more. In addition, the present invention provides a method of driving a liquid crystal panel which displays grayscale levels by applying a driving signal, whose pulse width is modulated according to the grayscale level, to a pair of electrodes having liquid crystal interposed therebetween and displays white when no voltage is applied, the method comprising the steps of: detecting the temperature of the liquid crystal panel or the temperature of the surrounding environment in which the liquid crystal panel is disposed; discriminating whether or not the detected temperature is a predetermined threshold value or more; and when the detected temperature is discriminated to be the threshold value or more, defining the pulse width according to the grayscale level such that the pulse width of the driving signal is gradually decreased as the grayscale level becomes bright, and when the detected temperature is discriminated to be less than the threshold value, changing the pulse width such that the pulse width corresponding to the darkest grayscale level is smaller than the pulse width corresponding to that at which the temperature is the threshold value or more. According to the method, when the detected temperature is discriminated to be less than the threshold value (when it is in a low temperature region), because it may change from a normal temperature region a pulse width of only the brightest grayscale level or/and the darkest grayscale level rather than the whole area of a grayscale level range, the method does not need to separately prepare a pattern for low temperature about a relationship between grayscale level and a pulse width.

In addition, with the normally-white mode displaying white in a state of applying no voltage to the liquid crystal, it is necessary to gradually decrease a pulse width of driving signals as the grayscale level becomes bright, on the contrary, with the normally black mode displaying black in a state of applying no voltage, it is necessary to gradually increase a pulse width of a driving signal as the grayscale level becomes bright.

Because of this, a method of driving a liquid crystal panel according to present invention may be a method of driving a liquid crystal panel which displays grayscale levels by applying a driving signal, whose pulse width is modulated according to the grayscale level, to a pair of electrodes having liquid crystal interposed therebetween and displays white when voltage is applied, the method comprising the steps of: detecting the temperature of the liquid crystal panel or the temperature of the surrounding environment in which the liquid crystal panel is disposed; discriminating whether or not the detected temperature is a predetermined threshold value or more; and when the detected temperature is discriminated to be the threshold value or more, defining the pulse width according to the grayscale level such that the pulse width of the driving signal is gradually increased as the grayscale level becomes bright, and when the detected temperature is discriminated to be less than the threshold value, changing the pulse width such that the pulse width corresponding to the brightest grayscale level is smaller than the pulse width corresponding to that at which the temperature is the threshold value or more. In addition, a method of driving a liquid crystal panel according to present invention may be a method of driving a liquid crystal panel which displays grayscale levels by applying a driving signal, whose pulse width is modulated according to the grayscale level, to a pair of electrodes having liquid crystal interposed therebetween and displays white when voltage is applied, the method comprising the steps of: detecting the temperature of the liquid crystal panel or the temperature of the surrounding environment in which the liquid crystal panel is disposed; discriminating whether or not the detected temperature is a predetermined threshold value or more; and when the detected temperature is discriminated to be the threshold value or more, defining the pulse width according to the grayscale level such that the pulse width of the driving signal is gradually increased as the grayscale level becomes bright, and when the detected temperature is discriminated to be less than the threshold value, changing the pulse width such that the pulse width corresponding to the darkest grayscale level is larger than the pulse width corresponding to that at which the temperature is the threshold value or more.

In this driving method, it is preferable that, when the detected temperature is discriminated to be less than the threshold value, the pulse width corresponding to the brightest grayscale level or the pulse width corresponding to the darkest grayscale level be the pulse width corresponding to a predetermined intermediate grayscale level at which the temperature is the threshold value or more. According to the method, the number of the grayscale level in a low temperature region decreases in comparison with the number of a normal temperature region, but when it is in the low temperature region, regarding a pulse width corresponding to the brightest grayscale level or/and the darkest grayscale level, it is done by substituting a pulse width of a predetermined intermediate grayscale level in the normal temperature region. Here, it is desirable for the predetermined intermediate grayscale level to be the grayscale level which is one level darker than the brightest grayscale level or which is one level brighter than the darkest grayscale level.

In addition, in this driving method, when the temperature is discriminated to be less than the threshold value, the pulse width of the brightest grayscale level or/and the darkest grayscale level is changed from a normal temperature region, and therefore, if the detected temperature is in the vicinity of the threshold value, a change may occur frequently. Because of this, in a method of driving according to the present invention, it is desirable to provide a hysteresis characteristic in discriminating the detected temperature.

The present invention is not limited to a method of driving a liquid crystal panel, and is realized as a liquid crystal device. It is preferable that an electronic apparatus according to the present invention comprise such a liquid crystal device as a display device.

According to the present invention, it is possible to prevent the disorder of the grayscale level in a low temperature region by means of a simple construction.

BRIEF DESCRIPTION OF THE DRAWINGS

FIGS. 7A and B are diagrams showing conversion contents of a pulse width defining unit in a liquid crystal device.

FIG. 10 is a diagram showing conversion contents of a pulse width defining unit in case that an applied embodiment of the present invention is concerned.

DETAILED DESCRIPTION

Figure 1:
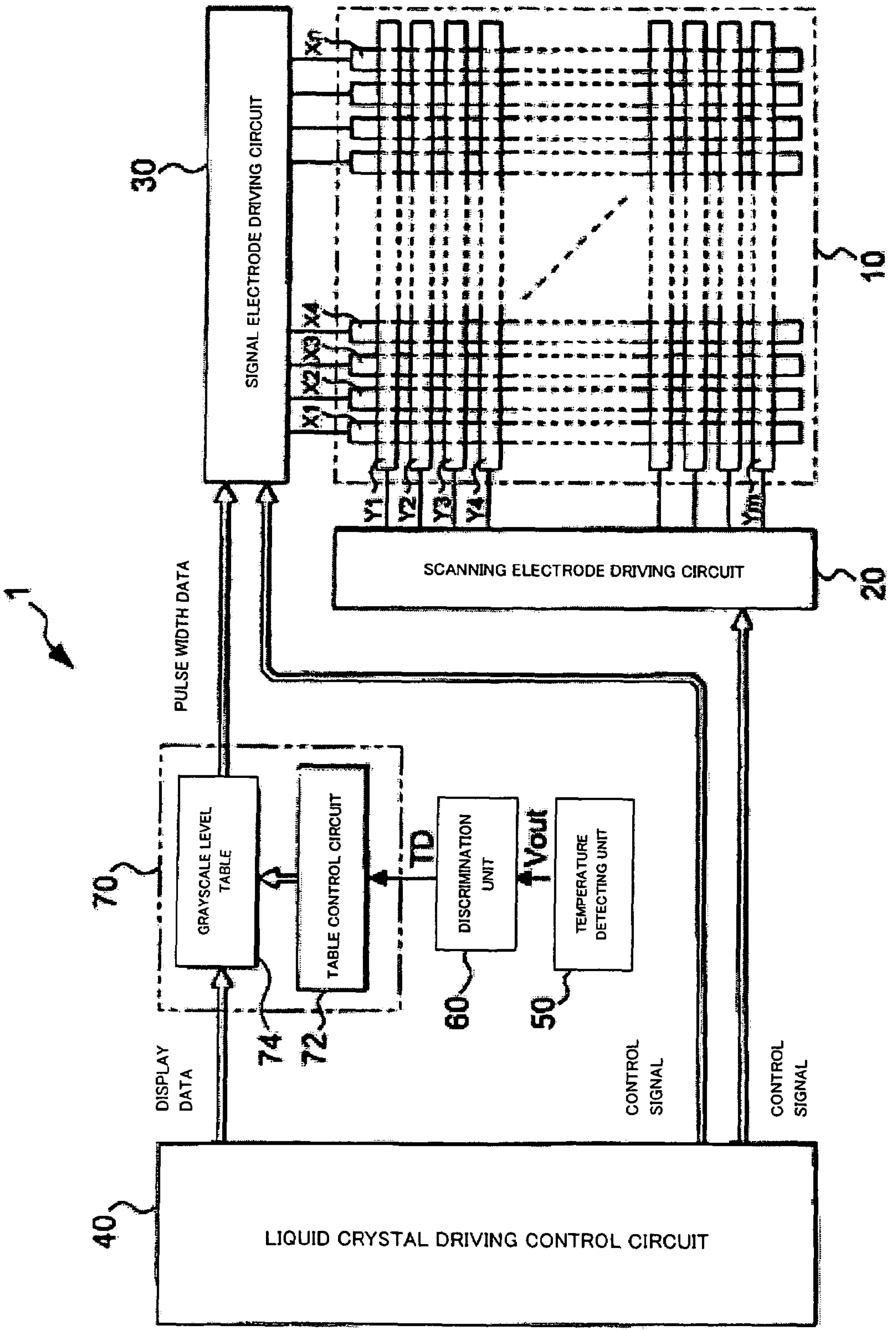
FIG. 1 is a diagram showing a construction of a liquid crystal device concerning the detailed description of the preferred embodiment of the present invention.

Hereinafter, the embodiments of the present invention will be described with reference to the drawings. FIG. 1 is a block diagram showing the construction of a passive matrix liquid crystal device according to an embodiment of the present invention.

As shown in this figure, a liquid crystal device 1 according to this embodiment comprises a liquid crystal panel 10, a scanning electrode driving circuit 20, a signal electrode driving circuit 30, a liquid crystal driving control circuit 40, a temperature detecting unit 50, a discrimination unit 60, and a pulse width defining unit 70.

Figure 2:
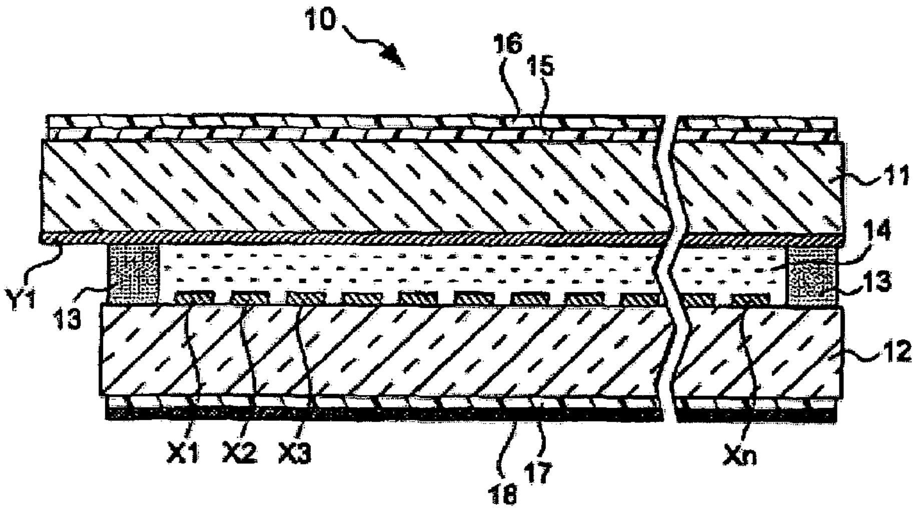
FIG. 2 is a sectional view showing a structure of a liquid crystal panel in a liquid crystal device.

Of these, the liquid crystal panel 10 is first explained. FIG. 2 is a sectional view showing the structure of the liquid crystal panel 10. The liquid crystal panel 10 comprises transparent substrates 11 and 12 which are joined together, while keeping a constant gap therebetween, by means of the sealant 13, and, for example, STN (Super Twisted Nematic) liquid crystal 14 sealed in the gap, as shown FIGS. 1 and 2.

Stripe-shaped scanning electrodes Y1, Y2, Y3, . . . , and Ym, which are made of a transparent conductive film such as ITO (Indium Tin Oxide), are formed at a side of the substrate 11 facing the substrate 12, while a phase difference film 15 and a polarizer 16 are laminated at a side opposite to the side of the substrate 11 facing the substrate 12. In addition, stripe-shaped signal electrodes X1, X2, X3, . . . , and Xn, which are similarly made of the transparent conductive film, are formed at a side of the substrate 12 facing the substrate 11 in the direction that is perpendicular to the scanning electrode Y1, Y2, Y3, . . . , and Ym, while a polarizer 17 and a light diffusing plate are disposed at a side opposite to the side of the substrate 12 facing the substrate 11. Herein, when the liquid crystal panel 10 according to this embodiment is a transmission type, a light illumination device (not shown) is installed under the light diffusing plate 18.

In addition, if the liquid crystal panel 10 is a reflection type, a reflector may be installed in a lower layer, or the polarizer 17 and the light diffusing plate 18 may be removed therefrom and light reflectivity may be given to the signal electrode X1, X2, X3, . . . , and Xn. In addition, a transflective liquid crystal panel in combination with a transmissive one and a reflective one may be used. Because, a signal electrode and a scanning electrode have a relative relationship to each other in a passive matrix liquid crystal device, the electrodes X1, X2, X3, . . . , and Xn may be scanning electrodes and the electrodes Y1, Y2, Y3, . . . , and Ym may be signal electrodes.

Figure 3:
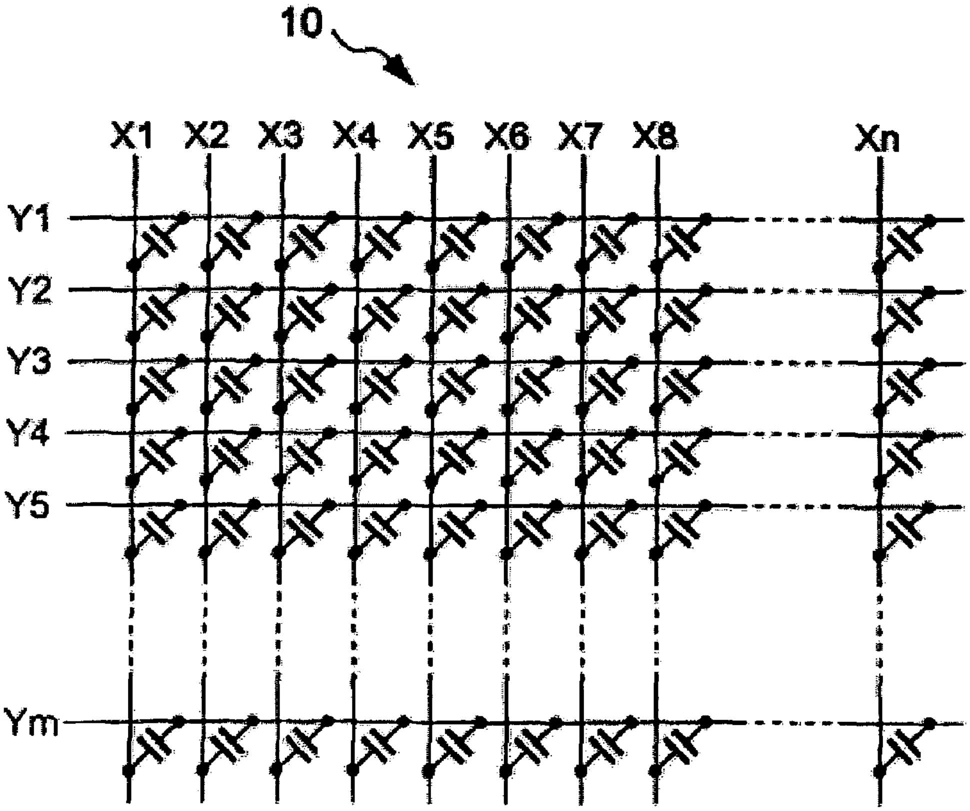
FIG. 3 is a diagram showing an electric equivalent circuit of the liquid crystal panel.

With the liquid crystal panel 10 of such a construction, the liquid crystal 14 is interposed between the respective portions where the signal electrodes X1, X2, X3, . . . , and Xn and the scanning electrodes Y1, Y2, Y3, . . . , and Ym intersect each other. Because of this, in intersecting portions of both electrodes, a capacity that a liquid crystal layer is interposed between both electrodes, that is, pixels are arranged in the form of a matrix of "m" lines and "n" columns as shown in FIG. 3.

In these pixels, the alignment state of liquid crystal interposed between both electrodes varies depending on the actual value of a voltage difference applied to both electrodes. Only a polarized light component along a transmission axis passes through the polarizer 17, and the passed light optically rotates according to the alignment state of a liquid crystal layer, but a light component that does not follow a transmission axis of the polarizer 16 is not emitted. Because of this, the amount of light emitted from the polarizer 16 and incident on the polarizer 17 decreases depending on the voltage effective value applied to the liquid crystal layer. Because of this, a desired image can be displayed on every pixel by controlling the voltage effective value applied to the liquid crystal layer.

Referring again to FIG. 1, the scanning electrode driving circuit 20 selects the scanning electrodes Y1, Y2, Y3, . . . , and Ym one line by one line during one vertical scanning period, and applies a selected voltage to a selected scanning electrode and a non-selected voltage to the scanning electrodes other than the selected scanning electrode, of the scanning electrodes Y1, Y2, Y3, . . . , and Ym, as a common signal, respectively.

On the other hand, the signal electrode driving circuit 30 applies a segment signal taking an on-state voltage over only a period designated by pulse width data (grayscale level data) to be described later and an off-state voltage over another period aside from the designated period, of periods to which the selected voltage is applied, to each of the pixels to be located on the scanning electrode to which the selected voltage is applied, through the signal electrodes X1, X2, X3, . . . , and Xn.

In detail, the signal electrode driving circuit 30 holds pulse width data on each of the pixels which are located on the corresponding scanning electrode before the selected voltage is applied to a certain one line of the scanning electrodes, respectively and simultaneously performs an operation generating a segment signal for each line, so that a period of the on-state voltage that should be applied to a certain one line of signal electrodes is to be a period designated by pulse width data corresponding to the pixel that is located on the signal electrode when the selected voltage is applied to the corresponding scanning electrode.

Figure 4:
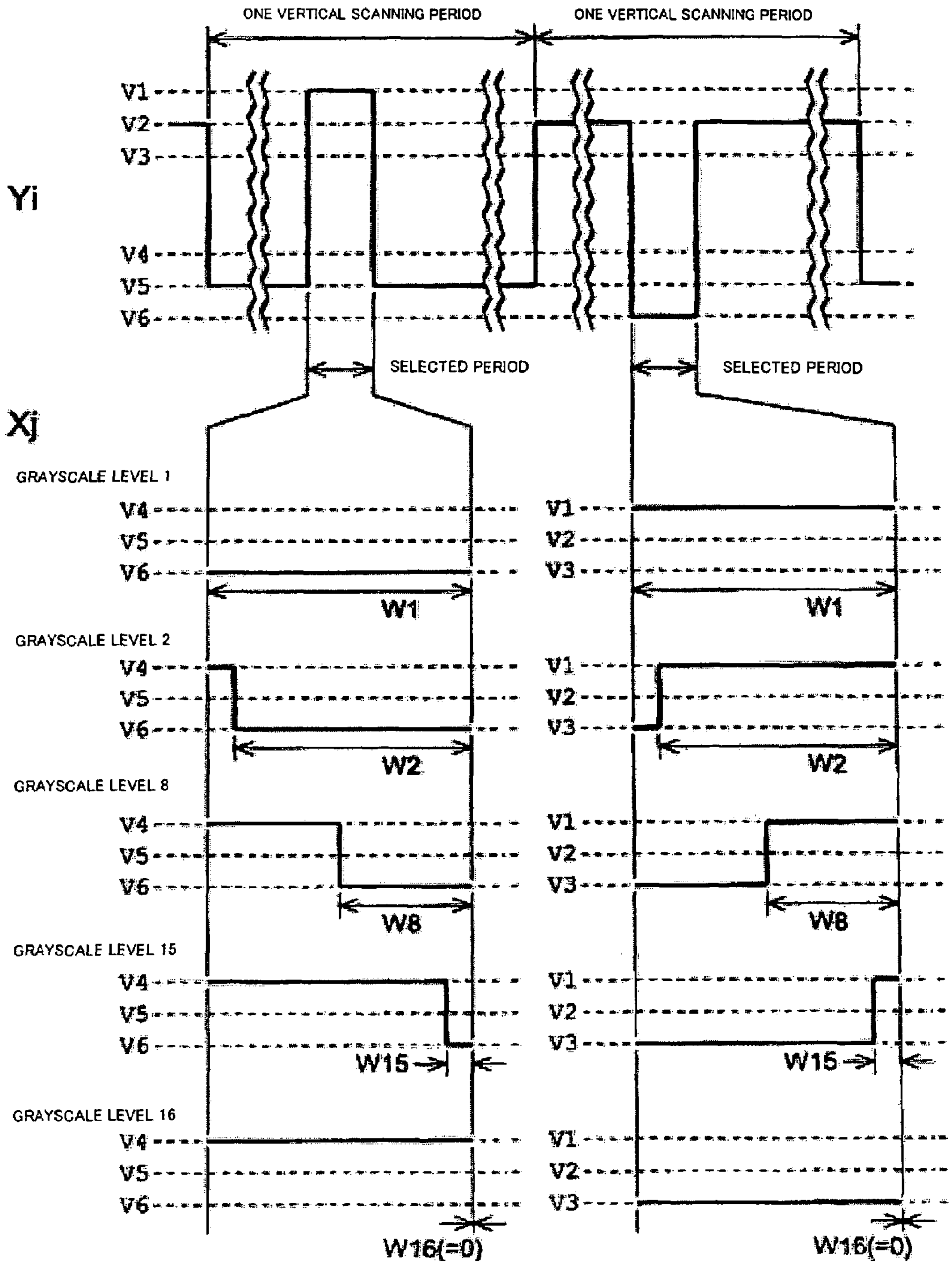
FIG. 4 is a diagram showing an example of a drive waveform in a liquid crystal device.

Here, for the convenience of illustration, a technique for driving the liquid crystal by the common signal and the segment signal is described now. FIG. 4 is a diagram dividing a driving signal applied to a pixel to be located in the i-th line and j-th column in a normal temperature region into a waveform of a common signal applied to a scanning electrode of the i-th line (i is an integer of 1 or more and m or less) and a waveform of a segment signal applied to a signal electrode of the j-th column (j is an integer of 1 or more and n or less), respectively.

As shown in this figure, the common signal applied to the scanning electrode Yi of the i-th line becomes the voltage V5 as a non-selected voltage during the first vertical scanning period. As for the common signal, the voltage V1 is chosen as a selected voltage over the selected period when the scanning electrode Yi of the i-th line is chosen. When the voltage V1 is chosen as a selected voltage to the scanning electrode, a common signal applied to a pixel to be located in the scanning electrode takes either the voltage V6 as the on-state voltage or the voltage V4 as the off-state voltage. In addition, the intermediate voltage between the voltage V6 and the voltage V4 is the non-selected voltage V5. In addition, there is a relationship that the voltage V6 having a big difference with respect to the voltage V1 that is a selected voltage becomes the on-state voltage, and the voltage V4 having a small difference with respect to the voltage V1 becomes the off-state voltage.

Herein, as a premise of this embodiment, it is assumed that when grayscale levels with 16 grayscale levels 1, 2, 3, . . . , and 16 are displayed, the grayscale level 1 indicates the darkest black display, and as a numerical value of the grayscale level becomes higher, brightness rises gradually, and the liquid crystal panel 10 represents a normally-white mode displaying white in a no-voltage applied state.

If, in this premise, the voltage V1 is applied to the scanning electrode Yi as a selected voltage, when a pixel to be located in i-th line and j-th column should be displayed with black corresponding to the grayscale level 1, a segment signal applied to the signal electrode Xj of the j-th column takes the voltage V6 of the on-state voltage over all periods while the selected voltage is applied as shown in FIG. 4. On the other hand, if the pixel is to be displayed with white of the grayscale level 16, the segment signal takes the voltage V4 of the off-state voltage over all periods while the selected voltage is applied as shown in the same figure, and the voltage V6 of the on-state voltage is not applied at all.

As described above, when the pixel is displayed with either black or white, a segment signal may take either the on-state voltage or the off-state voltage over all periods while the selected voltage is applied, but when a pixel is displayed with an intermediate grayscale level except for black and white, as a grayscale level falls down (as it is darkened) a segment signal is pulse width modulated so as to gradually raise the ratio of the on-state voltage to the off-state voltage. In FIG. 4, segment signals corresponding to the grayscale levels 1, 2, 8, 15, and 16 are illustrated. In addition, in the same figure, W1, W2, W8, W15, and W16 show the pulse widths to which the on-state voltage is to be applied in a period of applying the selected voltage in segment signals corresponding to the grayscale levels 1, 2, 8, 15, and 16, respectively.

Subsequently, when the choice of the i-th line of the scanning electrode Yi is completed, a common signal applied to the corresponding scanning electrode Yi again takes the voltage V5 as a non-selected voltage until the choice of the last m-th line of the scanning electrode Ym is completed (until the one vertical scanning period is completed).

In addition, because a scanning electrode is chosen in turn one line by one line until the one vertical scanning period is completed, whenever one line of a scanning electrode is chosen, a segment signal applied to the signal electrode Xj of the j-th column takes either the voltage V4 or the voltage V6 corresponding to the grayscale level of a pixel on the intersection of the signal electrode Xj and a newly selected scanning electrode.

In addition, because AC driving has been adopted as a principle with the liquid crystal panel 10, in this example, the common signal is turned over symmetrically taking an amplitude intermediate potential as a reference in the next vertical scanning period. In other words, in the next vertical scanning period, the selected voltage becomes the voltage V6 and the non-selected voltage becomes the voltage V2. On the other hand, as for a segment signal, the on-state voltage becomes the voltage V1 and the off-state voltage becomes the voltage V3 according to a turn over in a common signal.

Here, the explanation described above has been focused on a pixel of i-th line and j-th column from the viewpoint of a driving signal to a pixel; however, it can be also applied to the driving signal to other pixels. In other words, when a scanning electrode is chosen in the order of the first line, the second line, the third line, . . . , and the m-th line, and the voltage V1 (or, V6) as a selected voltage is applied to a selected scanning electrode, and similarly, also in each of the pixels located on a selected scanning electrode, a pulse width modulated segment signal is applied to a signal electrode so as to gradually raise the ratio of the period to apply voltage V6 (or V1) as the on-state voltage as the grayscale level falls down.

By such operation being carried out during one vertical scanning period, a voltage effective value applied to a pixel is controlled per pixel by means of a pulse width modulated segment signal corresponding to the contents to be displayed.

On the other hand, when the grayscale level is displayed in each pixel, information is necessary to specify a period to apply the on-state voltage, of the periods to apply selected voltage. This information is the pulse width data described above and the display data supplied from the liquid crystal driving control circuit 40 to be explained next is converted to the pulse width data by means of the pulse width defining unit 70 to be described below. The signal electrode driving circuit 30 generates a common signal such that a period for applying the on-state voltage, of the periods to apply selected voltage, is to be the period designated by pulse width data.

By the way, the liquid crystal driving control circuit 40 supplies a control signal for the scanning electrode driving circuit 20 and the signal electrode driving circuit 30, respectively, and controls so that the operation of both driving circuits synchronize with each other. In addition, the liquid crystal driving control circuit 40 outputs display data specifying the grayscale level to every pixel so as to synchronize to the operation of both driving circuits.

Figure 5:
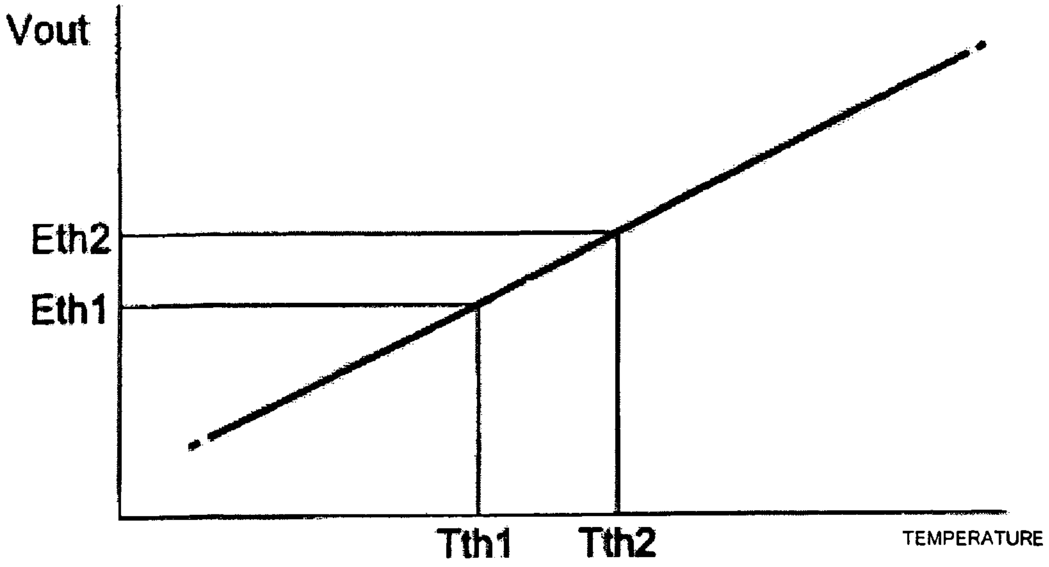
FIG. 5 is a diagram showing a characteristic of a temperature detecting unit in a liquid crystal device.

As for the temperature detecting unit 50, while it is installed in the part which does not have any influence on the visibility of an image displayed in the liquid crystal panel 10, for example, outside the display frame, it detects temperature of the liquid crystal panel 10, and outputs the detection signal Vout of the voltage corresponding to the detected temperature. Here, the voltage of detection signal Vout varies with the detected temperature, for example, a characteristic as shown in FIG. 5. In other words, the detected temperature becomes high, the voltage of the detection signal Vout becomes high.

In addition, the temperature detecting unit 50 may install various sensors in the liquid crystal panel 10, but it may also be installed in its periphery to detect the environmental temperature of the liquid crystal panel 10. In addition, a thermistor using the resistance of a bulk semiconductor (a silicon substrate) varying with the temperature may be used for the temperature detecting unit 50. When a silicon substrate is used for the temperature detecting unit 50, all the components except for the liquid crystal panel 10 may be integrated in one chip onto the silicon substrate.

Figure 6:
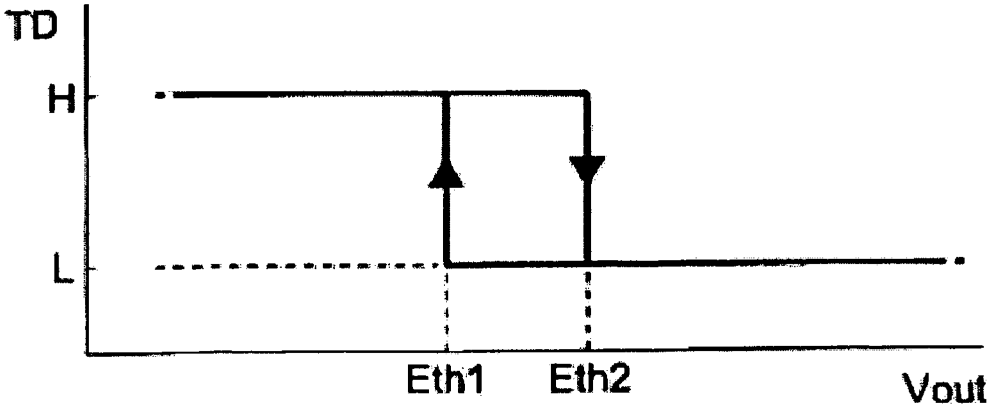
FIG. 6 is a diagram showing a characteristic of discrimination unit in a liquid crystal device.

The discrimination unit 60 is a kind of Schmitt trigger circuit, and inputs the detection signal Vout from the temperature detecting unit 50, compares with threshold voltages Eth1 and Eth2 (but, Eth1<Eth2), and outputs the signal TD showing the result of the comparison. More specifically, as shown in FIG. 6, as for the discrimination unit 60, if the voltage of the detection signal Vout falls gradually from the state that is high enough and the voltage of the detection signal Vout goes lower than the threshold voltage Eth1, the signal TD is reversed from an L level to an H level, while if the voltage of detection signal Vout rises gradually from a state that is low enough and the voltage of detection signal Vout goes higher than the threshold voltage Eth2, the signal TD is reversed from an H level to an L level.

Here, in the discrimination unit 60, if the temperature of the liquid crystal panel 10 falls gradually and goes lower than temperature Tth1, the signal TD is reversed from an L level to an H level, while if the temperature rises gradually and it goes higher than temperature Tth2, the signal TD is reversed from an H level to an L level, assuming that the temperatures when the voltage of detection signal Vout becomes the threshold voltages Eth1 and Eth2 are Tth1 and Tth2, respectively (refer to FIG. 5).

Here, it is assumed that if the signal TD is in a state of an L level, the temperature of the liquid crystal panel 10 is in a normal temperature region, and if the signal TD is in a state of an H level, the temperature is in a low temperature region. In addition, the temperature Tth2, while depending on a characteristic of applied liquid crystal, is set in the vicinity of 0° C. with this embodiment, and the temperature Tth1 is set a little lower than 0° C. Hereinafter, unless otherwise indicated, Tth1 is assumed as −10° C., and Tth2 is assumed as 0° C.

The pulse width defining unit 70 is composed of a grayscale level table 72 and a table control circuit 74. Of these, the grayscale level table 72 stores in advance the relationship of a designated grayscale level by means of display data and a pulse width of a driving signal, for example, as shown in FIG. 7(A). In other words, in the grayscale level table 72, the period that should apply the on-state voltage to a signal electrode during the period that a selected voltage is applied to a selected scanning electrode (a pulse width) is prescribed for every grayscale level from 1 to 16. In addition, the pulse widths W1 to W16 have the relationship of W1>W2>W3> . . . >W16 in FIG. 7(A). Of these, the pulse width W1 is equal to a period to apply a selected voltage, and the pulse width W16 is zero.

As described above, the reason that a pulse width becomes narrow as the grayscale level becomes bright is why the normally-white mode is assumed as a premise with this embodiment, as mentioned earlier. Therefore, when it comes to the case that liquid crystal panel displays black in a state when voltage is not applied with the normally black mode, the contents of the grayscale level table 72 is to be prescribed as the grayscale level becomes bright, a pulse width adversely becomes wide. In addition, such a pulse width is established considering a so-called V-T characteristic to show a relationship between the voltage (actual value) and a transmittance or a so-called gamma characteristic.

When the signal TD by the discrimination unit 60 is in an L level (in other words, in the case where temperature of the liquid crystal panel 10 is in a normal temperature region), referring to the grayscale level table 72 shown in FIG. 7(A), the table control circuit 74 just converts the display data supplied from the liquid crystal driving control circuit 40 to the data of a pulse width corresponding to the grayscale level that it specifies (pulse width data).

But, when the signal TD by the discrimination unit 60 is in an H level (in other words, in the case where temperature of liquid crystal panel 10 is in a low temperature region), if a designated grayscale level by means of display data is the maximum value 16, then the table control circuit 74 converts the display data to data of the pulse width W15 corresponding to the grayscale level 15 one level darker than the pulse width W16 corresponding to the grayscale level 16, and if a designated grayscale level by means of display data is other than level 16, then the table control circuit 74 just converts the display data to data of a pulse width corresponding to it.

After all, considering the whole of the pulse width defining unit 70, a relationship between the grayscale level and a pulse width to a level of the signal TD are as shown in FIG. 7(B). In other words, the only difference between the case that the signal TD is in an H level, and the case that the signal TD is in an L level, is that when signal TD is in an L level, a pulse width corresponding to the grayscale level 16 is W16, and when the signal TD is in an H level, a pulse width corresponding to the grayscale level 16 is only W15 which is the same as the grayscale level 15.

Figure 8:
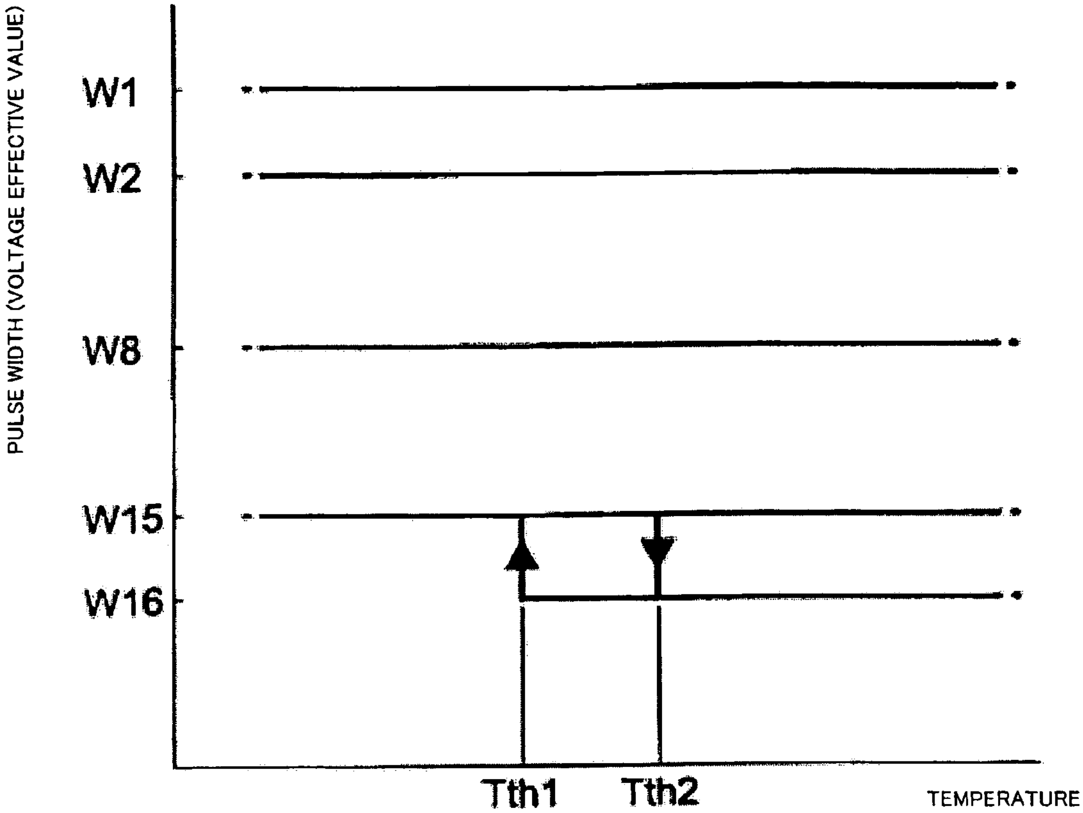
FIG. 8 is a diagram showing a characteristic of temperature pulse width in a liquid crystal device.

In addition, if the temperature of the liquid crystal panel 10, as stated above, decreases from a normal temperature region and goes under the temperature Tth1, the signal TD reverses from an L level to an H level, and if the temperature rises from a low temperature region, and goes higher than the temperature Tth2, it reverses from an H level to an L level; and therefore, in this embodiment, for example, a pulse width corresponding to the grayscale levels 1, 2, 8, 15, and 16 (voltage effective value) relative to a temperature varies as shown in FIG. 8.

Here, before explaining an effect of the liquid crystal device 10 according to this embodiment, the reason why grayscale level turning over occurs in a low temperature region is examined.

Figure 15:
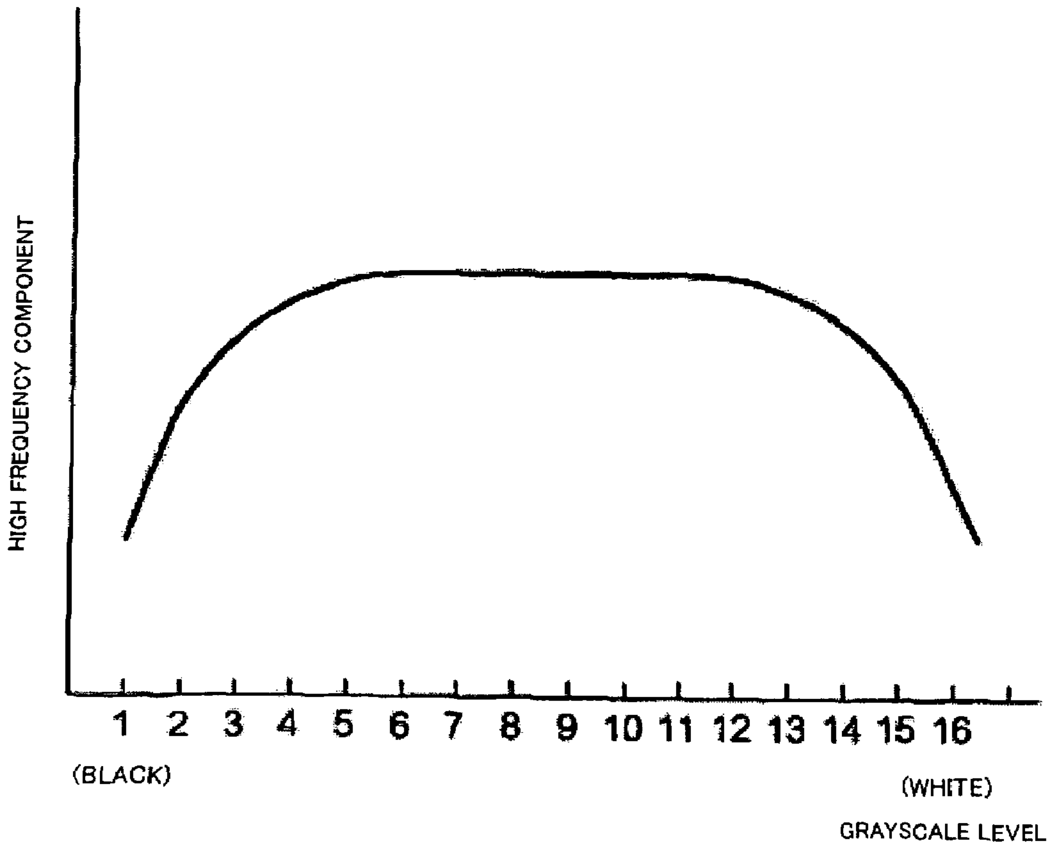
FIG. 15 is a diagram showing a size of a high frequency component of a driving signal corresponding to each grayscale level.

First, FIG. 15 shows the size of the high frequency component that is acquired through Fourier transform in a voltage change of a driving signal at each grayscale level (a normal temperature region). If it is found from this figure that a high frequency component superposed by a driving signal applied to liquid crystal becomes the highest at the time of an approximately intermediate grayscale level 8 (or 9), and as the grayscale level moves away from the intermediate value, then it falls gradually and goes to the lowest at the time of the grayscale levels 1 and 16.

In addition, the maximum value in the high frequency component superposed to the driving signal is referred to, for the convenience of illustration, as frequency (high), and the minimum value is referred to as frequency (low), and the approximately intermediate value is referred to as frequency (middle), respectively. Grayscale levels corresponding to the frequency (middle) are generally 2 and 15.

Figure 16:
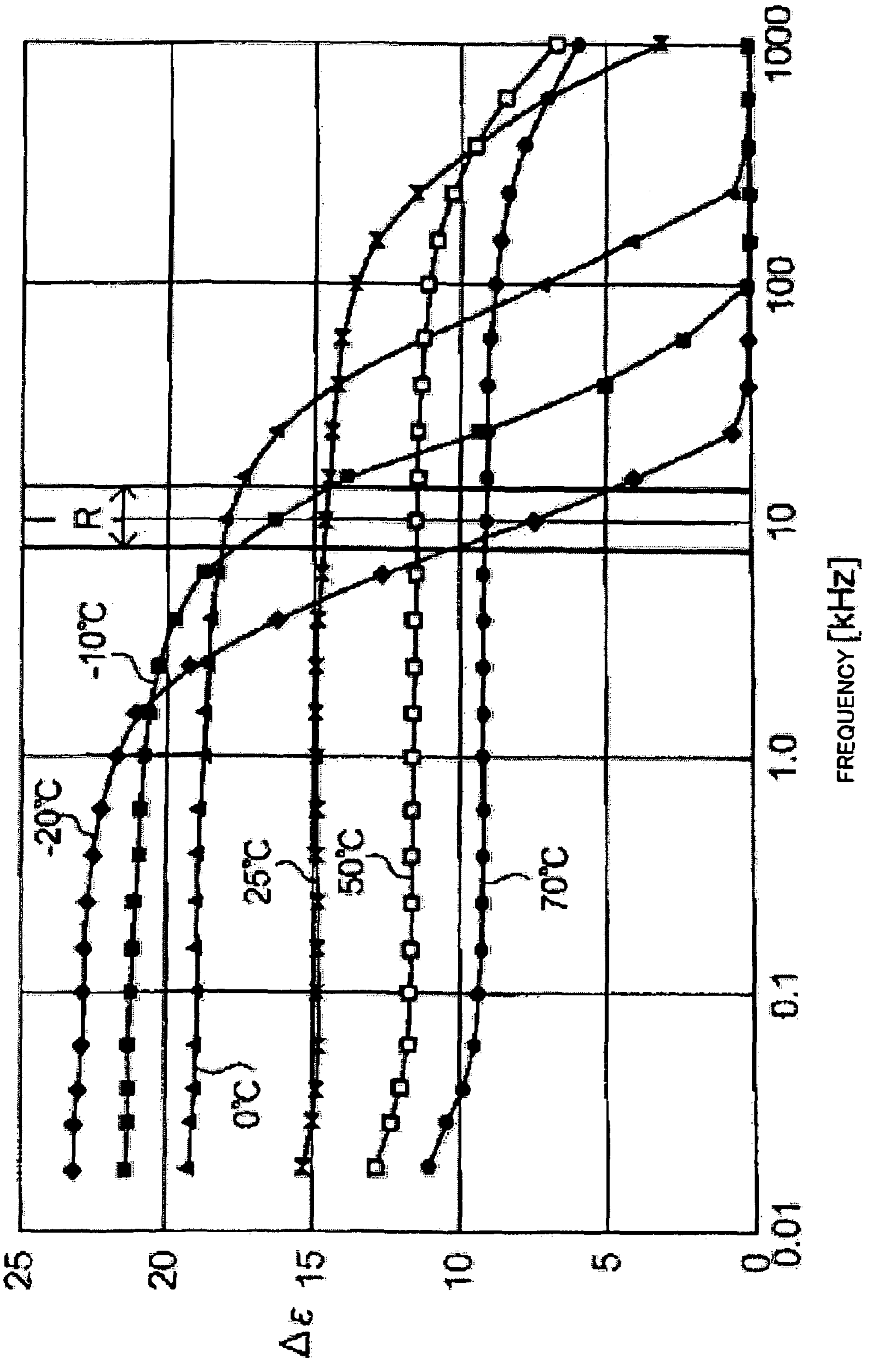
FIG. 16 is a diagram showing a characteristic of anisotropy of the dielectric constant of liquid crystal as opposed to frequency.

In addition, FIG. 16 shows the frequency characteristic of the dielectric anisotropy of liquid crystal taking temperature as a parameter. As shown in this figure, the dielectric anisotropy Δ∈ of liquid crystal is constant in a comparatively high state at a low frequency, but when frequency becomes high, the dielectric anisotropy Δ∈ tends to fall suddenly. Further, the frequency at which the dielectric anisotropy Δ∈ suddenly decreases belongs to the high frequency side when temperature is high, but as temperature goes low there is a tendency to shift to the low frequency side.

In FIG. 16, it is expected that liquid crystal is substantially driven at the frequency as shown in range R. In the range R, Δ∈ does not vary much while frequency varies in the case of 25° C. that is a normal temperature, but when it comes to 0° C., Δ∈ slightly changes according to frequencies, and when it comes to −10° C. or less, Δ∈ suddenly changes according to frequencies.

By the way, the threshold voltage Vth to drive liquid crystal is proportional to $(k/\Delta\in)^{1/2}$. Here, concerning the threshold voltage Vth, if the voltage applied to liquid crystal is higher than this voltage, an optical property begins to vary. In addition, k is a value related to a coefficient of elasticity of liquid crystal. In addition, a relationship between the threshold voltage Vth and dielectric anisotropy Δ∈ is introduced in detail, for example, as an equation 2.15 in the "bases and applications of liquid crystal (Sei-chi Matsumoto and Ichiyoshi Tsunoda)", issued by Kogyo Chosakai Publishing Co., Ltd., Japan, P. 36.

Figure 17:
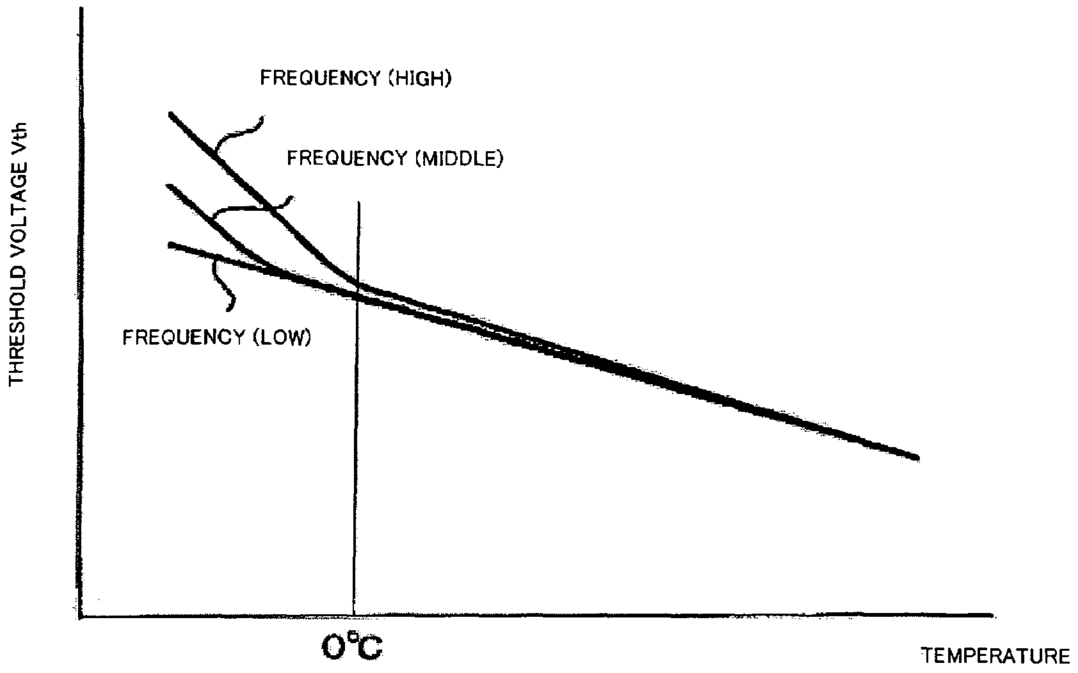
FIG. 17 is a diagram showing a characteristic of the threshold value of liquid crystal as opposed to temperature.

From the point that the threshold voltage Vth depends on the dielectric anisotropy Δ∈ and the dielectric anisotropy Δ∈ has temperature and frequency characteristics shown in FIG. 16, the threshold voltage Vth is conceived to have relationships as shown in FIG. 17 for temperature and frequency. In other words, as shown in this figure, the threshold voltage Vth is almost the same regardless of frequency in a normal temperature region, but it suddenly rises as frequency becomes high in a low temperature region.

Figure 18A:
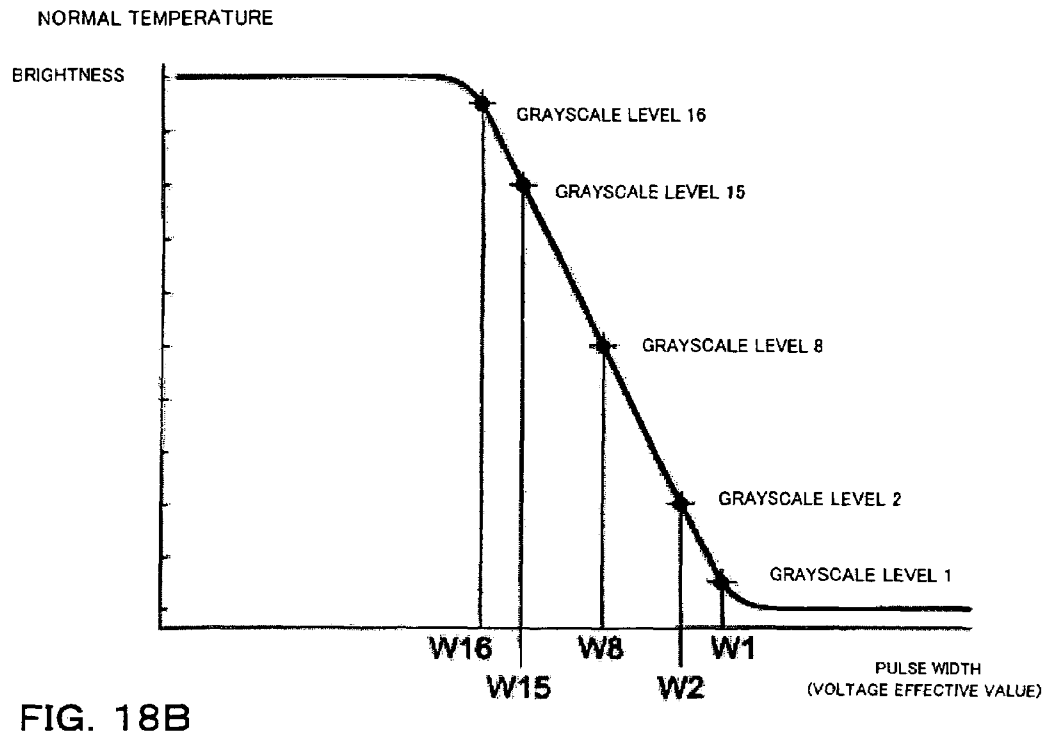
FIGS. 18A and B are diagrams showing the grayscale level turning over at the time of low temperature.

The relationship (a so-called V-T characteristic) between voltage effective value applied to a liquid crystal layer and brightness (transmittance or reflectance) generally follows the relationship shown in FIG. 18(A) if the size of a high frequency component superposed to the driving signal is not considered.

As mentioned earlier, when the grayscale level varies, the size of a high frequency component superposed to the driving signal varies as shown in FIG. 15, but the threshold voltage Vth is approximately the same regardless of frequency in a normal temperature region (refer to FIG. 17); therefore, even if the grayscale level varies, the threshold voltage Vth does not vary. As for a normal temperature region, because a liquid crystal layer is driven with a characteristic shown in FIG. 18(A), the driving point corresponding to the grayscale levels 1, 2, 8 (9), 15, and 16, for example, is the same as the illustration, and brightness follows the order of the grayscale level.

Figure 18B:
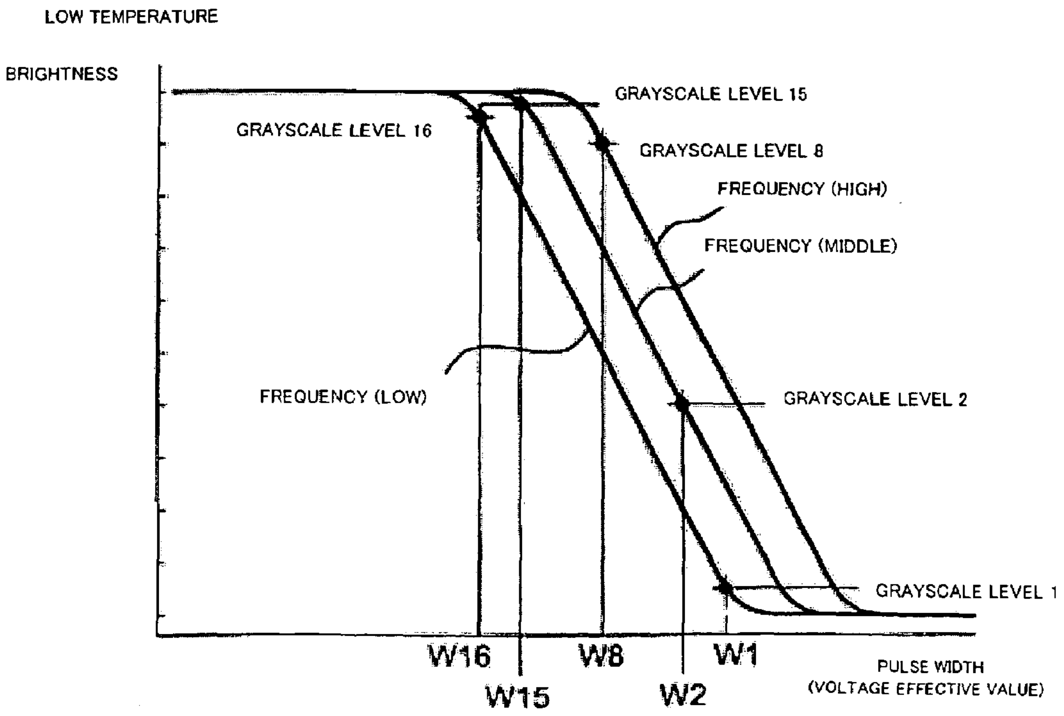

However, in a low temperature region, as frequency becomes high the threshold voltage Vth suddenly rises (refer to FIG. 17), and a V-T characteristic shifts to the right direction as shown in FIG. 18(B). In other words, a V-T characteristic applied to every grayscale level is different. For example, liquid crystal is driven with a different characteristic as shown in FIG. 18(B) as for the grayscale levels 1 and 16 of frequency (low), the grayscale levels 2 and 15 of frequency (middle) and the grayscale level 8 of frequency (high). Therefore, in this example, a reversed phenomenon occurs where the brightness of the grayscale level 16 that should be the best becomes darker than brightness of the next grayscale level 15 (grayscale level turning over).

Figure 12A:
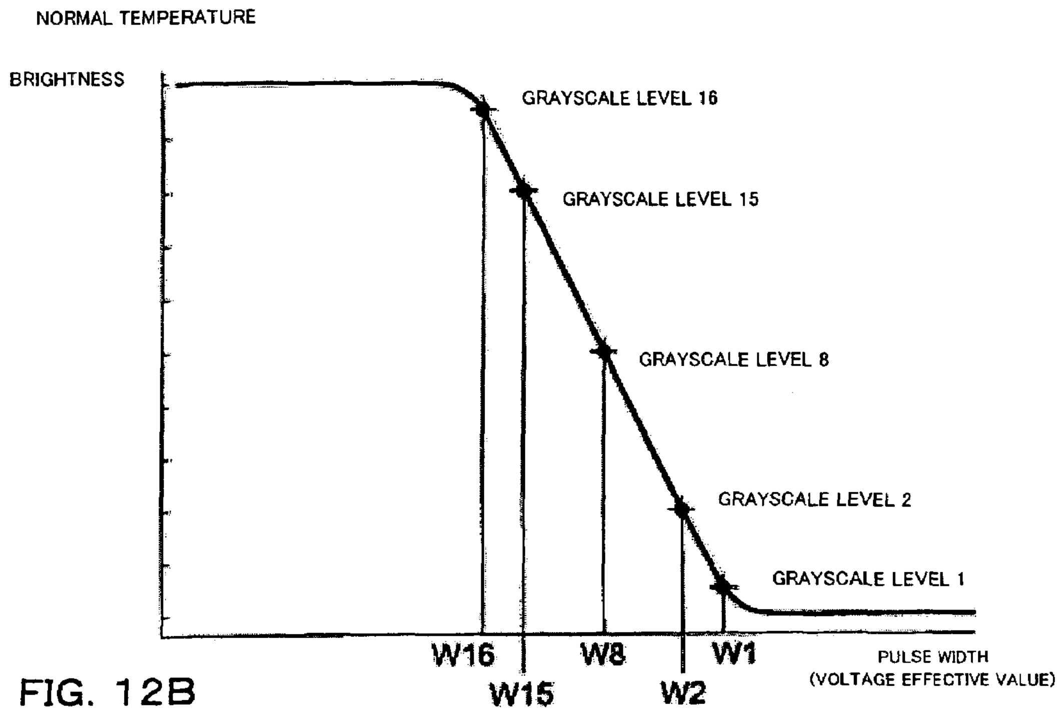
FIGS. 12A and B are diagrams showing a V-T characteristic in a liquid crystal device.
Figure 12B:
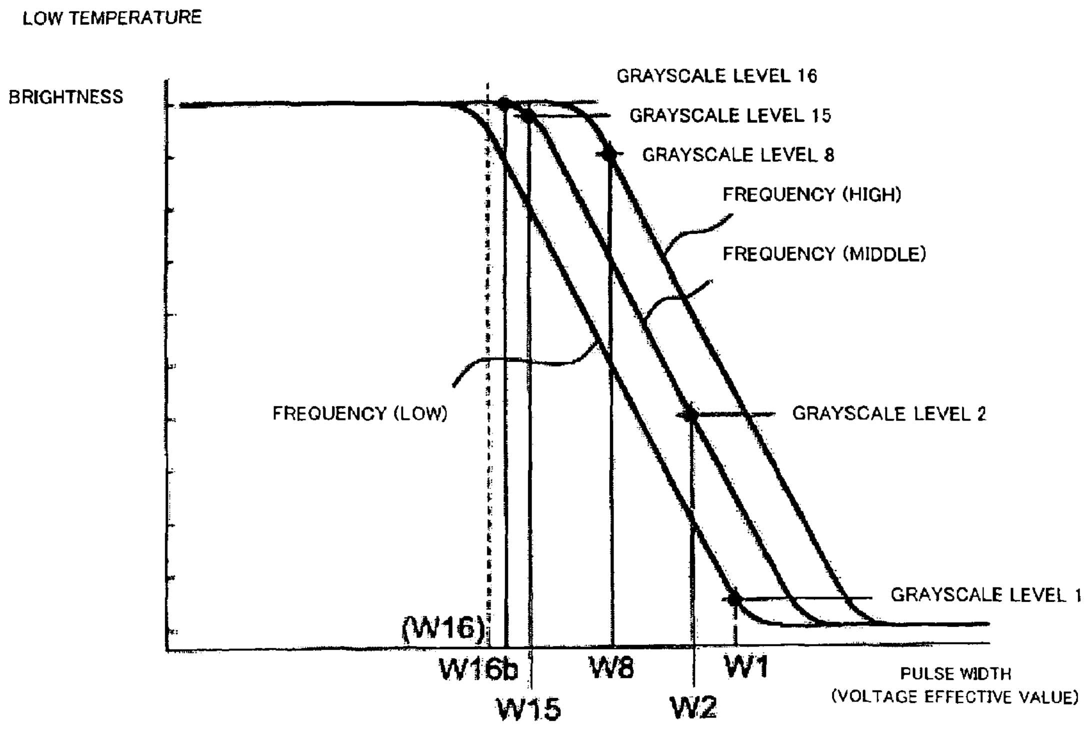
Figure 19:
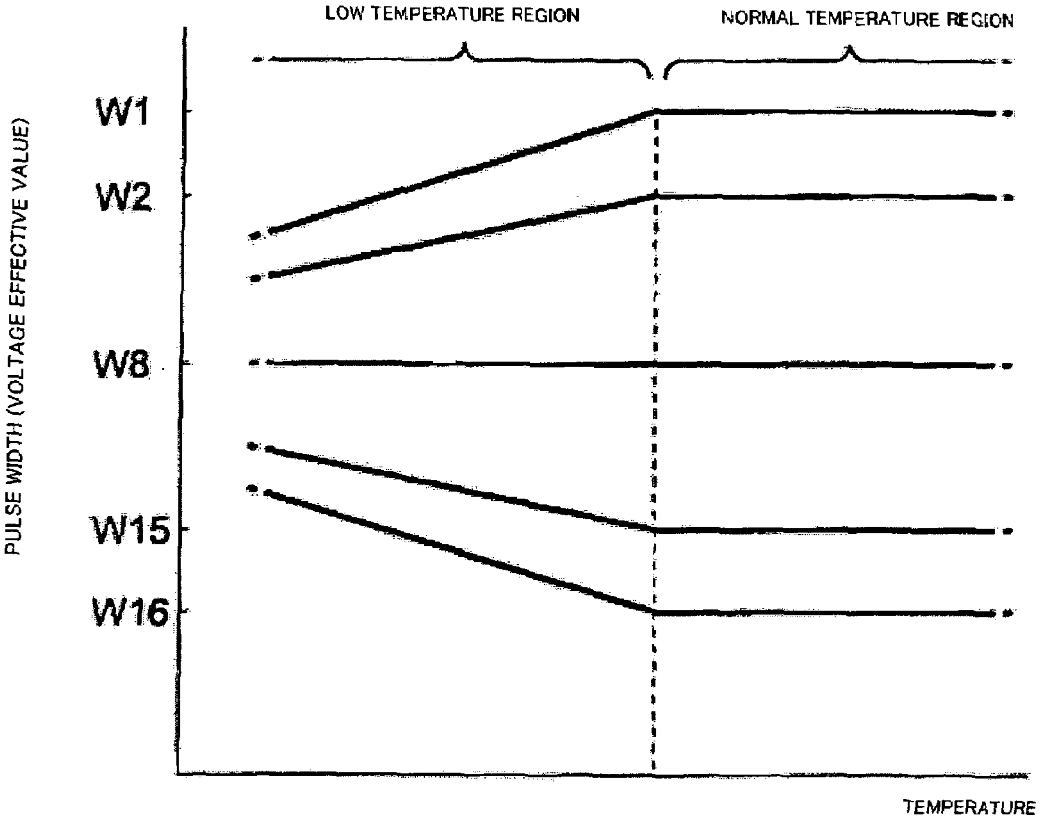
FIG. 19 is a diagram showing a characteristic of a temperature—pulse width in a conventional liquid crystal device.
Figure 20A:
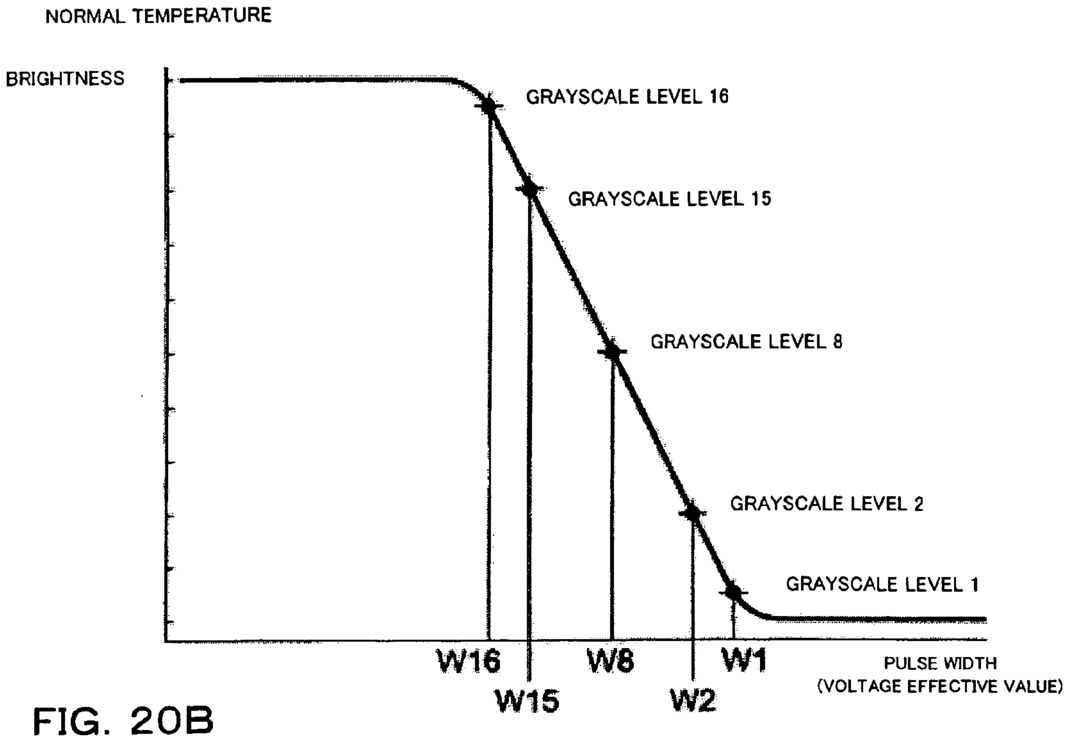
FIGS. 20A and B are diagrams showing a V-T characteristic in a conventional liquid crystal device.
Figure 20B:
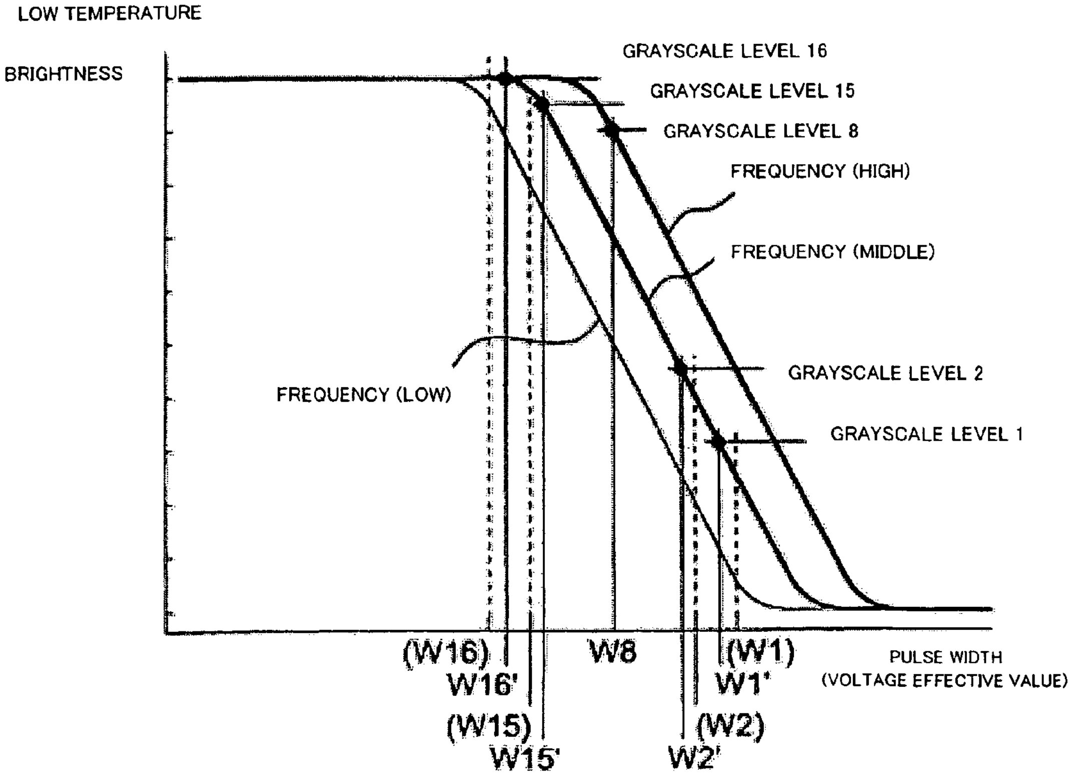

To prevent this grayscale level turning over, in the technology described in Japanese Unexamined Patent Application Publication No. 2001-159753, as shown in FIG. 19 because pulse widths from the maximum value to the minimum value of the grayscale levels are changed in a low temperature region, each high frequency component is superimposed in a driving signal corresponding to the grayscale levels 1 and 16, which approaches the frequency of driving signal applied to liquid crystal in the case of displaying an intermediate grayscale level. In this way, the grayscale levels 1 and 16 in a low temperature region are substantially driven at the frequency as much as that of the grayscale levels 2 and 15 in a normal temperature region. Therefore, as shown in FIG. 20(B), as for the grayscale levels 1 and 16, liquid crystal is driven with a V-T characteristic corresponding to the frequency (middle) of the same degree as the grayscale levels 2 and 15. Further, in a low temperature region, a pulse width becomes larger than in a normal temperature region at the grayscale level 2, and voltage effective value rises; on the other hand, a pulse width becomes smaller than in a normal temperature region at the grayscale level 15, and voltage effective value is lowered. As a result, as shown in FIG. 12(B), the order of brightness in a low temperature region accords with the order of the grayscale levels and the grayscale level turning over is prevented from happening. In addition, FIG. 20(A) is a V-T characteristic of a normal temperature region, which is shown for comparison.

But, in this technique, it is as stated above that a construction to change the grayscale level to pulse width data becomes complicated in a low temperature region.

Figure 9A:
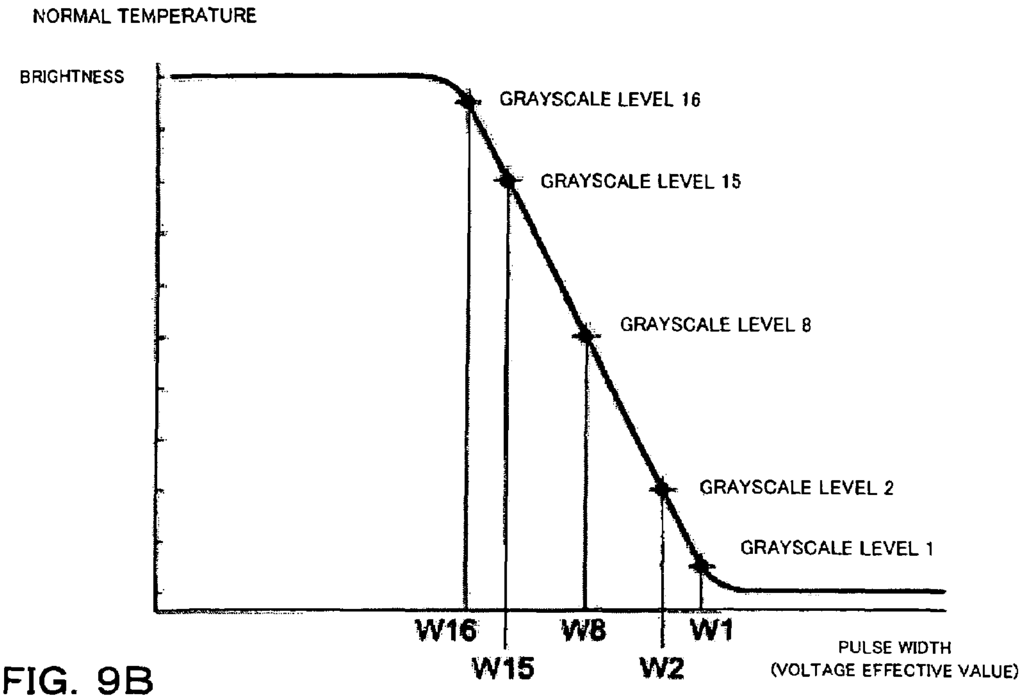
FIGS. 9A and B are diagrams showing a V-T characteristic in a liquid crystal device.
Figure 9B:
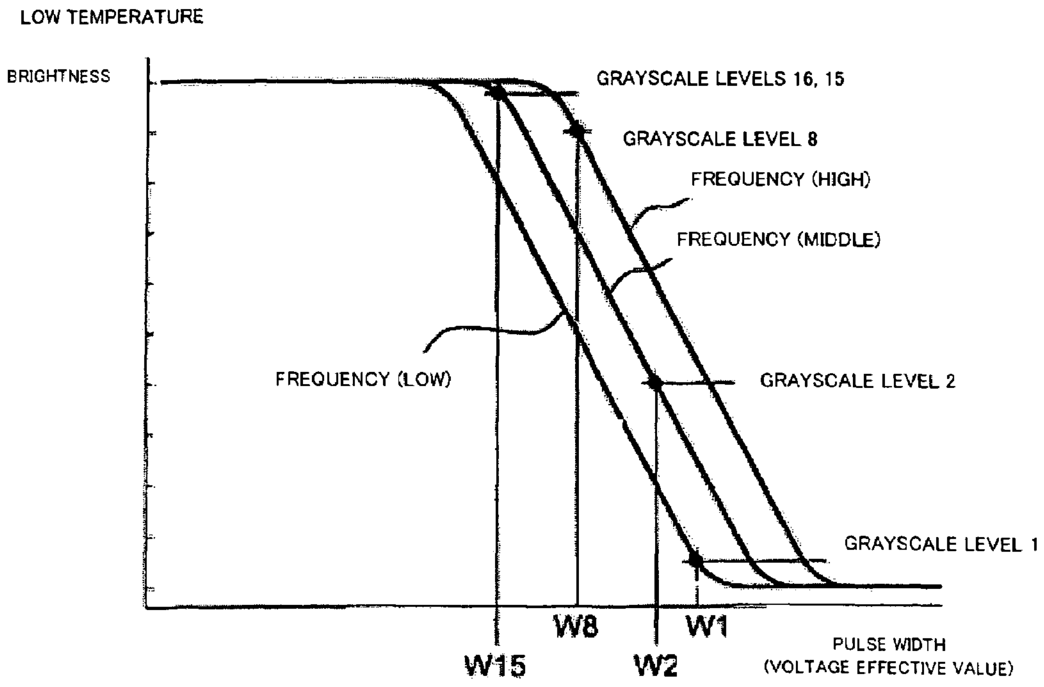

On the other hand, as for the liquid crystal device 1 according to this embodiment, because the pulse width W16 corresponding to the grayscale level 16 is only substituted to the pulse width W15 corresponding to the grayscale level 15 in a low temperature region, the construction becomes extremely simplified. In addition, this substitution means that, the number of the display grayscale level in a low temperature region decreases only one from the number of the display grayscale level 16 in a normal temperature region, but it also means at the same time that the grayscale levels 15 and 16 which are turned over in a low temperature region are the same grayscale level. Because of this, according to this embodiment, the grayscale level turning over in a low temperature region should not occur. As described above, the signal TD is reversed from an L level to an H level to substitute the pulse width W15, corresponding to the grayscale level 15 for the pulse width W16, corresponding to the grayscale level 16 in the liquid crystal device 1 according to this embodiment. With the liquid crystal device 1 according to this embodiment, the temperature Tth1 corresponding to the threshold voltage Eth1 is −10° C. and produces grayscale level turning over in a low temperature region. Here, in a low temperature region, when the grayscale levels 16 and 15 are appointed, as a result that a high frequency component is superimposed in the driving signal, it is expected that liquid crystal is driven with a V-T characteristic corresponding to frequency (middle) as shown in FIG. 9(B). In addition, as the pulse width W1 corresponding to the grayscale level 1 is not changed, brightness does not vary that much. In addition, FIG. 9(A) is a V-T characteristic in a normal temperature region, and is the same as FIG. 18(A), but is shown to compare with a low temperature region. FIG. 12(A) to be described below is the same case.

With the liquid crystal device 1 according to this embodiment, the signal TD is reversed from an H level to an L level and it is possible to make temperature Tth2 corresponding to the threshold voltage Eth2 to be −10° C. which is the same as Tth1. However, when the temperature of the liquid crystal panel 10 changes repeatedly around the −10° C., a level of the signal TD changes with a short period. Therefore, a grayscale level changes by a short period, and a problem may occur in that it is hard to catch the display. Therefore, with the liquid crystal device 1 according to this embodiment, the temperature Tth2 is 0° C. that is separated from −10° C. of the temperature Tth1. In other words, because the liquid crystal device 1 according to this embodiment gives a hysteresis characteristic to the distinction whether it belongs to a low temperature region or a normal temperature region, a pulse width of the grayscale level 16 is prevented from being frequently changed even when the temperature of the liquid crystal panel 10 (or the peripheral temperature) is in the vicinity of the threshold value.

Next, an application of the embodiment described above is explained. According to the liquid crystal device 1 of the embodiment described above, since a pulse width of the grayscale level 16 is identified with a pulse width of the grayscale level 15 in a low temperature region, the number of the display grayscale level decreases only one from the number of the display grayscale level 16 in a normal temperature region. But, with this embodiment, the number of the display grayscale level of a low temperature region is the same number as with a normal temperature region. In addition, this application is partly different from the embodiment described above in conversion contents of the pulse width defining unit 70, and others are the same. Thus, regarding this application, the explanation will be focused mainly on this difference.

FIG. 10 shows a relationship between a grayscale level and a pulse width to a level of the signal TD in the pulse width defining unit 70, and it is different from FIG. 7(B) in that a pulse width of the grayscale level 16 is W16*b* when the signal TD is in an L level. This pulse width W16*b* satisfies the relationship of W16<W16*b*<W15, and in more detail, is wider than the corresponding pulse width W16 in a normal temperature region, while it is narrower than pulse width W15 of the grayscale level 15 which is one level darker.

Figure 11:
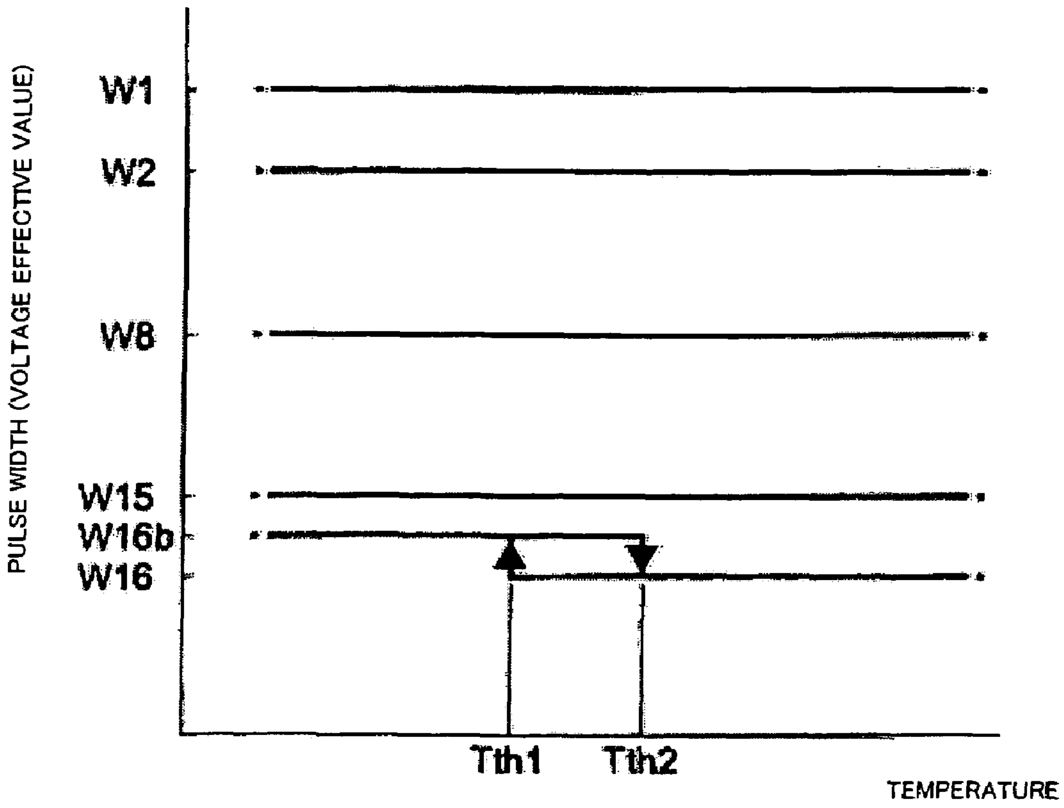
FIG. 11 is a diagram showing a characteristic of a temperature—pulse width in a liquid crystal device.

Therefore, in this application, a pulse width (voltage effective value) corresponding to the grayscale levels 1, 2, 8, 15, and 16 varies with temperature as shown in FIG. 11.

In other words, while the pulse width (voltage effective value) corresponding to the grayscale level 16, is returned from W16 to W16*b* if the temperature of the liquid crystal panel 10 decreases from a normal temperature region and goes under the temperature Tth1, the pulse width is returned to from W16*b* to W16 if the temperature rises from a low temperature region, and goes over the temperature Tth2. A pulse width corresponding to the grayscale levels 1 to 15 other than the pulse width described above is constant regardless of temperature. In addition, FIG. 11 only illustrates the grayscale levels 1, 2, 8, 15, and 16.

In this application, because the pulse width W16*b* corresponding to the grayscale level 16 in a low temperature region becomes wider than the pulse width W16 in a normal temperature region, as a result that a high frequency component is superimposed in the driving signal, liquid crystal is driven with a V-T characteristic corresponding to frequency (middle) which is substantially the same as the grayscale level 15 as shown in FIG. 12(B). Further, because the pulse width W16*b* is narrow as compared to the pulse width W15 corresponding to the grayscale level 15, the voltage effective value becomes low; therefore, the brightness of the grayscale level 16 becomes brighter than the brightness of the grayscale level 15 against corresponding V-T characteristics.

Therefore, this application makes it possible to prevent the grayscale level from turning over by securing the number of the grayscale level display in a low temperature region.

The present invention is not limited to the detailed description of the preferred embodiment and the application, and it is possible to perform various kinds of transformations and applications.

For example, in the embodiment, while the pulse width of the brightest grayscale level 16 is changed to be wide in a low temperature region, the pulse width of the darkest grayscale level 1 may also be changed to be narrow.

According to an embodiment and an application, referring to FIG. 9(B) and FIG. 12(B), though a pulse width corresponding to the grayscale level 2 which is one level brighter is W2, which is constant regardless of temperature, the threshold voltage Vth rises (a V-T characteristic shifts to the right side) due to a frequency component superimposed in a driving signal being high, and brightness rises. On the other hand, a pulse width corresponding to the darkest grayscale level 1 is also constant as a value of W1 regardless of temperature, but a frequency component is not so high and the threshold voltage Vth does not vary much as compared with the grayscale level 2 (a V-T characteristic does not shift). Because of this, the brightness does not vary that much.

Therefore, a brightness difference between the grayscale level 1 and the grayscale level 2 in a low temperature region tends to expand more than that in a normal temperature region.

Thus, when a pulse width of the darkest grayscale level 1 narrows, by means that a high frequency component that is superimposed in a driving signal becomes high, liquid crystal is driven with a V-T characteristic substantially corresponding to frequency (middle) and brightness rises. Because of this, the expansion of a brightness difference in a low temperature region is prevented, and it is possible to prevent the disorder of the grayscale level, in this meaning.

Of course, in a low temperature region, it is also preferable that while a pulse width of the brightest grayscale level is to be wide, a pulse width of the darkest grayscale level is to be narrow.

In addition, as already described above, in case of the normally black mode, the contents of the grayscale level table 72 show that as the grayscale level becomes bright, a pulse width is to be adversely increased, and therefore, it may prevent a brightness difference in a low temperature region from expansion by increasing a pulse width of the grayscale level 1 which is the darkest, and a pulse width of the brightest grayscale level may be decreased, and at the same time a pulse width of the darkest grayscale level may be increased in a low temperature region.

In addition, in the preferred embodiment as described above, the pulse width defining unit 70 is separated from the signal electrode driving circuit 30, but it may be integrated in one chip.

Figure 13:
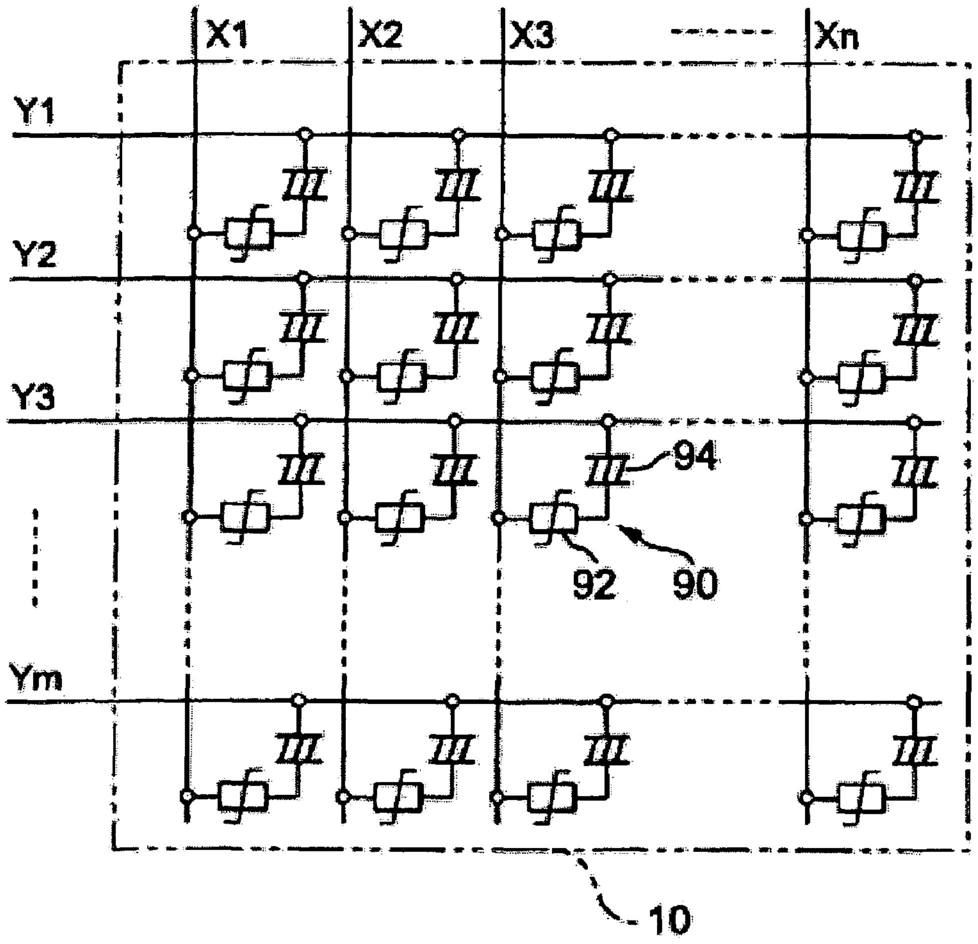
FIG. 13 is a diagram showing the other example of the liquid crystal panel.

In the detailed description of the embodiment, the liquid crystal panel 10 is assumed to be a passive matrix, but the invention can also be applied to a liquid crystal device adopting a two-terminal type element as an active element. FIG. 13 is a figure showing the construction of the liquid crystal panel 10 adopting TFD (Thin Film Diode) as a two-terminal type element.

As shown in this figure, while n lines of a data line (a segment electrode) are formed along the column direction in the liquid crystal panel 10, m lines of a scanning line (a common electrode) are formed along a line direction, and at the same time, the pixel 90 is formed at the intersection part of a data line and a scanning line. Here, each pixel 90 is formed from the serial connection of TFD 92 and the liquid crystal capacitance 94. The liquid crystal capacitance 94 described above becomes the construction that liquid crystal is interposed between a scanning line functioning as a counter electrode and a rectangular pixel electrode. On the other hand, TFD 92 becomes the sandwich structure of a conductor/insulator/conductor which is generally known. Because of this, TFD 92 comes to have a diode switching characteristic where an electric current—voltage characteristic becomes non-linear over the bi-direction of plus and minus. In such a construction, regardless of the data voltage applied to a data line, when a selected voltage forcibly makes TFD 92 to be a state of electric conducting (on), the TFD 92 corresponding to an intersection of the scanning line and the data line turns on, and the electric charge corresponding to the difference of the selected voltage and the data voltage is accumulated to the liquid crystal capacitance

94 connected to the TFD 92 which is turned on. After the accumulation of electric charge, when a non-selected voltage is applied to a scanning line, the turned on TFD 92 turns off, and the accumulation of an electric charge in the liquid crystal capacitance 94 is maintained. In the liquid crystal capacitance 94, an alignment state of liquid crystal varies depending on the quantity of electric charge accumulated, and the light amount to pass a polarizer varies also according to the quantity of accumulated electric charge. Because of this, as for the liquid crystal panel in FIG. 13, it is possible to display a predetermined grayscale level by controlling the quantity of accumulation of an electric charge in liquid crystal capacitance every pixel by means of the data voltage when a selected voltage is applied as shown in FIG. 1. In addition, the TFD 92 in FIG. 13 is connected to a data line, but may be connected to a scanning line.

In addition, when a two-terminal type element is used as an active element and a passive matrix is used, a period that a scanning line (a common electrode) is chosen by one line (one parallel scanning period) splits into a first half period and a later half period. As an example of these, while it is preferable that a pulse width is modulated with the on-state voltage as a data signal (a segment signal) by applying a selected voltage to the scanning line during the later half period, it is also preferable to be a construction to give during the first half period a reverse characteristic signal of the signal which should be applied during the later half period.

For an active element, it is not limited to a two-terminal type element such as a TFD, and a three-terminal type element such as a TFT may be used. Explanation on the details is omitted, but in the case of using a three-terminal type element as an active element, it becomes the construction that while a TFT connected to the scanning line is turned on by means of applying a selected voltage to a scanning line, a pulse width modulated signal is given corresponding to the grayscale level of a pixel through a data line.

On the other hand, in the detailed description of the preferred embodiment, it has been explained about a construction that when a selected voltage is applied, the on-state voltage is applied earlier in terms of time, but it is also preferable as a construction to apply the on-state voltage later in terms of time.

In the detailed description of the embodiment, an STN type liquid crystal is adopted for explanation, but it is also preferable to use liquid crystal of a TN type or liquid crystal of the guest host type, where dye (a guest) having anisotropy for absorption of visible light along the direction of the longest diameter and the direction of a shorter axis in the elliptical of a molecule is dissolved in the liquid crystal (a host) with the constant molecule alignment to arrange the dye molecule in parallel with the liquid crystal molecule. It is also preferable to be a construction of vertical alignment (homeotropic alignment), where while a liquid crystal molecule arranges in a vertical direction against both substrates at the time of applying no voltage, a liquid crystal molecule arranges in a horizontal direction against both substrates at the time of applying a voltage. In addition, it is also preferable to be a construction of parallel (horizontal) alignment (homogeneous alignment), where while a liquid crystal molecule arranges in a horizontal direction against both substrates at the time of applying no voltage, a liquid crystal molecule arranges in a vertical direction against both substrates at the time of applying a voltage. As thus described, with the present invention, a variety of liquid crystal types and alignment modes can be used.

Further, the present invention is not limited to the display with 16 grayscale levels, and it may be applicable to the display with lower grayscale levels like 4 and 8, or the display with higher grayscale levels like 32 and 64. Furthermore, it is also applicable in the case to be expressed as a color display, which is performed with the construction of 1 dot comprising three pixels such as R (red), G (green) and B (blue).

Figure 14:
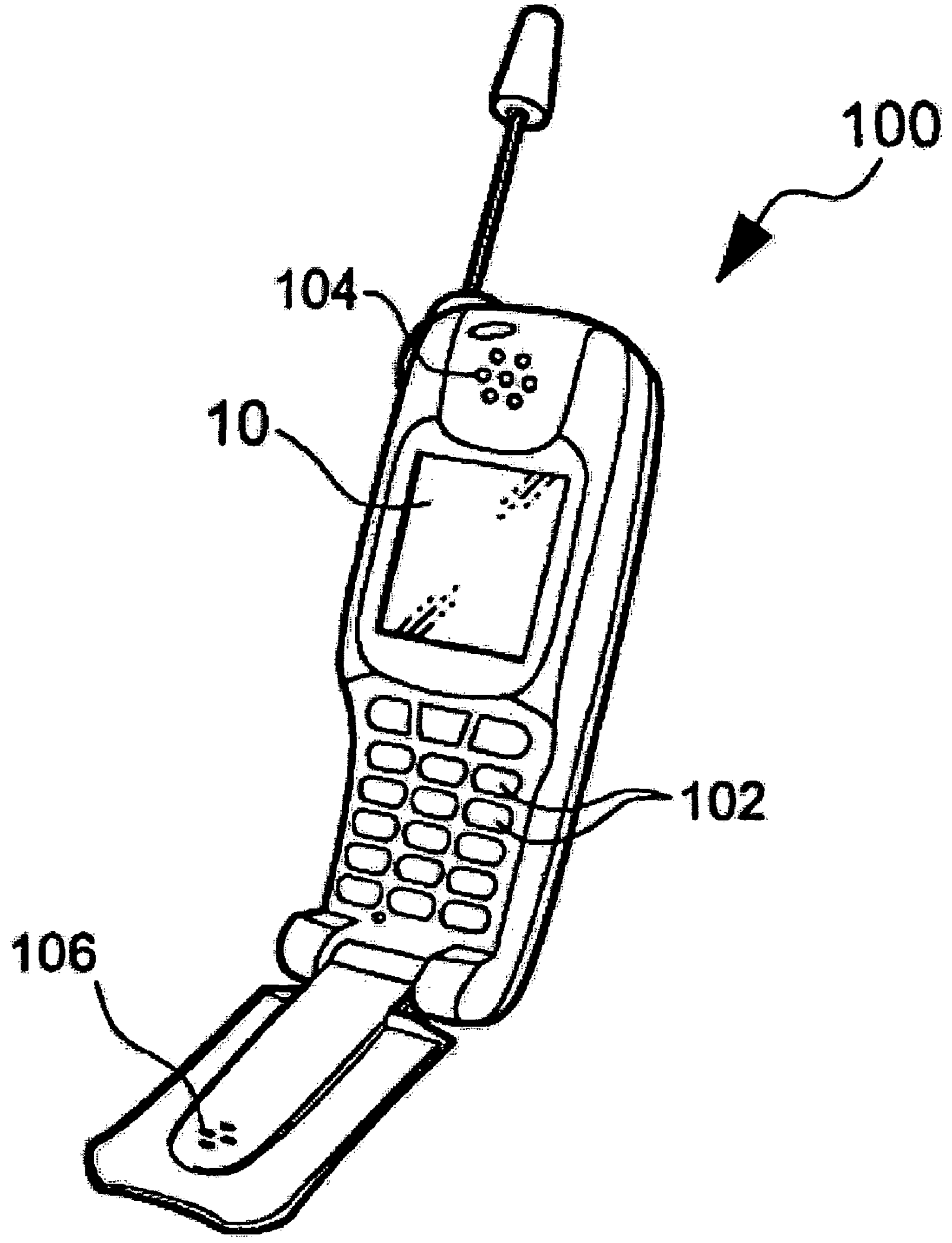
FIG. 14 is a perspective view showing a construction of the cellular phone device that adopted a liquid crystal device.

In the following description, a liquid crystal device as described in the detailed description of the preferred embodiment is explained from the viewpoint of being adopted for electronic apparatus. FIG. 14 is a perspective diagram that shows a construction of the cellular phone 100 which uses the liquid crystal device 1 as a display device.

As shown in this figure, the cellular phone 100 comprises the liquid crystal panel 10, an earpiece 104 and a mouthpiece 106, in addition to a plurality of operation buttons 102. In addition, as for the construction of the liquid crystal device 1, other components aside from the liquid crystal panel 10 are built in a cellular phone, and therefore, they are not shown externally.

For an example of an electronic apparatus, there are such as a personal computer, a digital still camera, a liquid crystal television, a viewfinder-type video tape recorder, a monitor-direct-view-type video tape recorder, a car navigation apparatus, a pager, an electronic note, an electronic calculator, a word processor, a work station, a picture phone, a POS terminal and an apparatus comprising a touch panel, besides a cellular phone. As a display device for these various electronic apparatuses, it is not necessary to say again that the liquid crystal device 1 can be applied. As for any one of the electronic apparatuses, it is possible to solve the problem related to the disorder of the grayscale level in a low temperature region by means of the simple construction.

What is claimed is:

1. A method of driving a liquid crystal panel which displays grayscale levels by applying a driving signal to a pair of electrodes having liquid crystal interposed therebetween and displays white when no voltage is applied, the driving signal having a pulse width that is modulated according to the grayscale level, the method comprising the steps of:

detecting at least one of a temperature of the liquid crystal panel and a temperature of a surrounding environment in which the liquid crystal panel is disposed;

discriminating whether the detected temperature is a predetermined threshold value or more; and if the detected temperature is discriminated to be the threshold value or more, defining the pulse width according to the grayscale level such that the pulse width of the driving signal is gradually decreased as the grayscale level becomes bright, and if the detected temperature is discriminated to be less than the threshold value, changing the pulse width such that the pulse width corresponding to the brightest grayscale level is larger than the pulse width corresponding to that at which the temperature is the threshold value or more.

2. The method of driving a liquid crystal panel according to claim 1, wherein if the detected temperature is discriminated to be less than the threshold value, the pulse width corresponding to the brightest grayscale level is larger than the pulse width corresponding to that at which the temperature is the threshold value or more, and the pulse width corresponding to a darkest grayscale level is smaller than the pulse width corresponding to that at which the temperature is the threshold value or more.

3. A method of driving a liquid crystal panel which displays grayscale levels by applying a driving signal to a pair of electrodes having liquid crystal interposed therebetween and displays white when voltage is applied, the driving signal having a pulse width that is modulated according to the grayscale level, the method comprising the steps of:

detecting at least one of a temperature of the liquid crystal panel or a temperature of a surrounding environment in which the liquid crystal panel is disposed;

discriminating whether the detected temperature is a predetermined threshold value or more; and if the detected temperature is discriminated to be the threshold value or more, defining the pulse width according to the grayscale level such that the pulse width of the driving signal is gradually increased as the grayscale level becomes bright, and if the detected temperature is discriminated to be less than the threshold value, changing the pulse width such that the pulse width corresponding to the brightest grayscale level is smaller than the pulse width corresponding to that at which the temperature is the threshold value or more.

4. The method of driving a liquid crystal panel according to claim 3, wherein if the detected temperature is discriminated to be less than the threshold value, the pulse width corresponding to the brightest grayscale level is smaller than the pulse width corresponding to that at which the temperature is the threshold value or more, and the pulse width corresponding to a darkest grayscale level is larger than the pulse width corresponding to that at which the temperature is the threshold value or more.

5. The method of driving a liquid crystal panel according to claim 3, wherein if the detected temperature is discriminated to be less than the threshold value, the pulse width corresponding to the brightest grayscale level is the pulse width corresponding to a predetermined intermediate grayscale level at which the temperature is the threshold value or more.

6. The method of driving a liquid crystal panel according to claim 4, wherein if the detected temperature is discriminated to be less than the threshold value, the pulse width corresponding to the darkest grayscale level is the pulse width corresponding to a predetermined intermediate grayscale level at which the temperature is the threshold value or more.

7. The method of driving a liquid crystal panel according to claim 3, wherein a hysteresis characteristic is provided in discriminating the detected temperature.

8. A method of driving a liquid crystal panel which displays grayscale levels by applying a driving signal to a pair of electrodes having liquid crystal interposed therebetween and displays white when no voltage is applied, the driving signal having a pulse width that is modulated according to the grayscale level, the method comprising the steps of:

detecting at least one of a temperature of the liquid crystal panel or a temperature of a surrounding environment in which the liquid crystal panel is disposed;

discriminating whether the detected temperature is a predetermined threshold value or more; and if the detected temperature is discriminated to be the threshold value or more, defining the pulse width according to the grayscale level such that the pulse width of the driving signal is gradually decreased as the grayscale level becomes bright, and if the detected temperature is discriminated to be less than the threshold value, changing the pulse width such that the pulse width corresponding to the darkest grayscale level is smaller than the pulse width corresponding to that at which the temperature is the threshold value or more.

9. A method of driving a liquid crystal panel which displays grayscale levels by applying a driving signal to a pair of electrodes having liquid crystal interposed therebetween and displays white when voltage is applied, the driving signal having a pulse width that is modulated according to the grayscale level, the method comprising the steps of:

detecting at least one of a temperature of the liquid crystal panel or a temperature of a surrounding environment in which the liquid crystal panel is disposed;

discriminating whether the detected temperature is a predetermined threshold value or more; and if the detected temperature is discriminated to be the threshold value or more, defining the pulse width according to the grayscale level such that the pulse width of the driving signal is gradually increased as the grayscale level becomes bright, and if the detected temperature is discriminated to be less than the threshold value, changing the pulse width such that the pulse width corresponding to the darkest grayscale level is larger than the pulse width corresponding to that at which the temperature is the threshold value or more.

10. A liquid crystal device comprising:

a liquid crystal panel displaying grayscale levels by applying a driving signal to a pair of electrodes having liquid crystal interposed therebetween and displaying white when no voltage is applied, the driving signal having a pulse width that is modulated according to the grayscale level;

a temperature detecting unit detecting at least one of a temperature of the liquid crystal panel or a temperature of a surrounding environment in which the liquid crystal panel is disposed;

a discrimination unit discriminating whether the temperature detected by the temperature detecting unit is a predetermined threshold value or more; and a pulse width defining unit that:

defines the pulse width according to the grayscale level such that the pulse width of the driving signal is gradually decreased as the grayscale level becomes bright when the temperature is discriminated to be the threshold value or more by the discrimination unit; and changes the pulse width such that the pulse width corresponding to the brightest grayscale level is larger than the pulse width corresponding to that at which the temperature is the threshold value or more when the temperature is discriminated to be less than the threshold value.

11. The liquid crystal device according to claim 10, wherein if the temperature is discriminated to be less than the threshold value by the discrimination unit, the pulse width corresponding to the brightest grayscale level is larger than the pulse width corresponding to that at which the temperature is the threshold value or more, and the pulse width corresponding to a darkest grayscale level is smaller than the pulse width corresponding to that at which the temperature is the threshold value or more.

12. The liquid crystal device according to claim 10, wherein the pulse width defining unit comprises a table pre-storing a relationship of the pulse width of the driving signal that gradually decreases as the grayscale level becomes bright.

13. A liquid crystal device comprising:

a liquid crystal panel displaying grayscale levels by applying a driving signal to a pair of electrodes having liquid crystal interposed therebetween and displaying white when voltage is applied, the driving signal having a pulse width that is modulated according to the grayscale level,;

a temperature detecting unit detecting at least one of a temperature of the liquid crystal panel and a temperature of a surrounding environment in which the liquid crystal panel is disposed;

a discrimination unit discriminating whether the temperature detected by the temperature detecting unit is a predetermined threshold value or more; and a pulse width defining unit that:

defines the pulse width according to the grayscale level such that the pulse width of the driving signal is gradually increased as the grayscale level becomes bright when the temperature is discriminated to be the threshold value or more by the discrimination unit; and changes the pulse width such that the pulse width corresponding to the brightest grayscale level is smaller than the pulse width corresponding to that at which the temperature is the threshold value or more when the temperature is discriminated to be less than the threshold value.

14. The liquid crystal device according to claim 13, wherein if the temperature is discriminated to be less than the threshold value by the discrimination unit, the pulse width corresponding to the brightest grayscale level is smaller than the pulse width corresponding to that at which the temperature is the threshold value or more, and the pulse width corresponding to a darkest grayscale level is larger than the pulse width corresponding to that at which the temperature is the threshold value or more.

15. The liquid crystal device according to claim 13, wherein the pulse width defining unit comprises a table pre-storing a relationship of the pulse width of the driving signal that gradually increases as the grayscale level becomes bright.

16. The liquid crystal device according to claim 13, wherein the pulse width defining unit defines the pulse width corresponding to the brightest grayscale level to be the pulse width corresponding to a predetermined intermediate grayscale level at which the temperature is the threshold value or more when the temperature is discriminated to be less than the threshold value by the discrimination unit.

17. The liquid crystal device according to claim 14, wherein the pulse width defining unit defines the pulse width corresponding to the darkest grayscale level to be the pulse width corresponding to a predetermined intermediate grayscale level at which the temperature is the threshold value or more when the temperature is discriminated to be less than the threshold value by the discrimination unit.

18. The liquid crystal device according to claim 13, wherein the discrimination unit provides a hysteresis characteristic in discriminating the temperatures detected by the temperature detecting unit.

19. A liquid crystal device comprising:

a liquid crystal panel displaying grayscale levels by applying a driving signal to a pair of electrodes having liquid crystal interposed therebetween and displaying white when no voltage is applied, the driving signal having a pulse width that is modulated according to the grayscale level;

a temperature detecting unit detecting at least one of a temperature of the liquid crystal panel and a temperature of a surrounding environment in which the liquid crystal panel is disposed;

a discrimination unit discriminating whether the temperature detected by the temperature detecting unit is a predetermined threshold value or more; and a pulse width defining unit that:

defines the pulse width according to the grayscale level such that the pulse width of the driving signal is gradually decreased as the grayscale level becomes bright when the temperature is discriminated to be the threshold value or more by the discrimination unit; and changes the pulse width such that the pulse width corresponding to the darkest grayscale level is smaller than the pulse width corresponding to that at which the temperature is the threshold value or more when the temperature is discriminated to be less than the threshold value.

20. A liquid crystal device comprising:

a liquid crystal panel displaying grayscale levels by applying a driving signal to a pair of electrodes having liquid crystal interposed therebetween and displaying white when voltage is applied, the driving signal having a pulse width that is modulated according to the grayscale level;

a temperature detecting unit detecting at least one of a temperature of the liquid crystal panel and a temperature of a surrounding environment in which the liquid crystal panel is disposed;

a discrimination unit discriminating whether the temperature detected by the temperature detecting unit is a predetermined threshold value or more; and a pulse width defining unit that:

defines the pulse width according to the grayscale level such that the pulse width of the driving signal is gradually increased as the grayscale level becomes bright when the temperature is discriminated to be the threshold value or more by the discrimination unit; and changes the pulse width such that the pulse width corresponding to the darkest grayscale level is larger than the pulse width corresponding to that at which the temperature is the threshold value or more when the temperature is discriminated to be less than the threshold value.

21. An electronic apparatus comprising:

the liquid crystal device according to claim 10 as a display device.

* * * * *